US011431988B2

(12) United States Patent
Filippov et al.

(10) Patent No.: US 11,431,988 B2
(45) Date of Patent: Aug. 30, 2022

(54) METHOD AND APPARATUS FOR INTRA SMOOTHING FOR INTRA SUB-PARTITIONS

(71) Applicant: HUAWEI TECHNOLOGIES CO., LTD., Shenzhen (CN)

(72) Inventors: Alexey Konstantinovich Filippov, Moscow (RU); Vasily Alexeevich Rufitskiy, Moscow (RU); Jianle Chen, Santa Clara, CA (US)

(73) Assignee: Huawei Technologies Co., Ltd., Shezhen (CN)

( * ) Notice: Subject to any disclaimer, the term of this patent is extended or adjusted under 35 U.S.C. 154(b) by 0 days.

(21) Appl. No.: 17/013,593

(22) Filed: Sep. 5, 2020

(65) Prior Publication Data

US 2020/0413072 A1     Dec. 31, 2020

Related U.S. Application Data

(63) Continuation of application No. PCT/CN2020/082145, filed on Mar. 30, 2020.
(Continued)

(51) Int. Cl.
*H04N 19/105* (2014.01)
*H04N 19/159* (2014.01)
(Continued)

(52) U.S. Cl.
CPC ......... *H04N 19/159* (2014.11); *H04N 19/105* (2014.11); *H04N 19/117* (2014.11);
(Continued)

(58) Field of Classification Search
None
See application file for complete search history.

(56) References Cited

U.S. PATENT DOCUMENTS

2009/0290805 A1   11/2009   Hattori
2011/0032396 A1   2/2011    Park et al.
(Continued)

FOREIGN PATENT DOCUMENTS

CN   106060564 A   10/2016
CN   108184115 A   6/2018
(Continued)

OTHER PUBLICATIONS

Santiago et al. CE3: Intra Sub-Partitions Coding Mode (Tests 1.1.1 and 1.1.2), Joint Video Experts Team (JVET) of ITU-T SG 16 WP 3 and ISO/IEC JTC 1/SC 29/WG 11, JVET-M0102-v5,13th Meeting: Marrakech, MA, Jan. 9-18, 2019, total 9 pages.
(Continued)

*Primary Examiner* — Alison Slater

(57) ABSTRACT

Devices and methods of intra prediction of a block of a picture are provided. In various embodiments, information indicating an Intra Sub-Partitions (ISP) split type can be obtained. A value of a filter flag can be set based on the ISP split type. For instance, the value of the filter flag can be set to 0 when the ISP split type does not indicate not to split a current block. A set of coefficients of an interpolation filter can then be selected according to the value of the filter flag. For instance, fG coefficients or fC coefficients can be selected based on the value of the filter flag. Still in those embodiment, the selected set of coefficients can be applied to reference samples. In some embodiments, the method removes mode dependency during selection of interpolation filter type. This could increase encoding or decoding efficiency.

17 Claims, 22 Drawing Sheets

Related U.S. Application Data

(60) Provisional application No. 62/825,793, filed on Mar. 28, 2019.

(51) Int. Cl.
| | | |
|---|---|---|
| *H04N 19/117* | (2014.01) | |
| *H04N 19/119* | (2014.01) | |
| *H04N 19/132* | (2014.01) | |
| *H04N 19/176* | (2014.01) | |
| *H04N 19/46* | (2014.01) | |
| *H04N 19/82* | (2014.01) | |

(52) U.S. Cl.
CPC ......... *H04N 19/119* (2014.11); *H04N 19/132* (2014.11); *H04N 19/176* (2014.11); *H04N 19/46* (2014.11); *H04N 19/82* (2014.11)

(56) References Cited

U.S. PATENT DOCUMENTS

| | | | |
|---|---|---|---|
| 2012/0224636 A1 | 9/2012 | Yoshino et al. | |
| 2016/0373743 A1 | 12/2016 | Zhao et al. | |
| 2017/0150180 A1 | 5/2017 | Lin et al. | |
| 2018/0091825 A1 | 3/2018 | Zhao et al. | |
| 2018/0098004 A1 | 4/2018 | Korneliussen | |
| 2020/0413072 A1* | 12/2020 | Filippov | H04N 19/117 |
| 2021/0377519 A1* | 12/2021 | Kim | H04N 19/105 |

FOREIGN PATENT DOCUMENTS

| | | |
|---|---|---|
| EP | 3276961 A1 | 1/2018 |
| WO | 2017052409 A1 | 3/2017 |
| WO | 2017084628 A1 | 5/2017 |

OTHER PUBLICATIONS

Benjamin Brass et al. Versatile Video Coding (Draft 4), Joint Video Experts Team (JVET) of ITU-T SG 16 WP 3 and ISO/IEC JTC 1/SC 29/WG 11, JVET-M1001-v7, 13th Meeting: Marrakech, MA, Jan. 9-18, 2019, total 299 pages.

ITU-T H.265(Feb. 2018), Series H: Audiovisual and Multimedia Systems Infrastructure of audiovisual services—Coding of moving video, High efficiency video coding, Feb. 2018. total 692 pages.

ITU-T H.264 Telecommunication Standardization Sector of ITU (Apr. 2017), Series H: Audiovisual and Multimedia Systems, Infrastructure of audiovisual services—Coding of moving video, Advanced video coding for generic audiovisual services, Apr. 2017. total 812 pages.

Algorithm description for Versatile Video Coding and Test Model 4 (VTM 4) et al., Joint Video Experts Team (JVET) of ITU-T SG 16 P 3 and ISO/IEC JTC 1/SC 29/WG 11,13th Meeting: Marrakech, MA, Jan. 9-18, 2019,JVET-M1002-v1, total:63 pages.

* cited by examiner

METHOD AND APPARATUS FOR INTRA SMOOTHING FOR INTRA SUB-PARTITIONS

CROSS-REFERENCE TO RELATED APPLICATION

This application is a continuation of International Application No. PCT/CN2020/082145, filed on Mar. 30, 2020, which claims priority to U.S. Provisional Application No. 62/825,793, filed on Mar. 28, 2019. The disclosures of the aforementioned applications are hereby incorporated by reference in their entireties.

TECHNICAL FIELD

Embodiments of the present application (disclosure) generally relate to the field of picture processing and more particularly to intra prediction, especially to method and apparatus for intra smoothing.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

A first aspect of the invention relates to a method of intra prediction of a block of a picture. The method includes: obtaining information of Intra Sub-Partitions (ISP), wherein the information of ISP indicates whether ISP is used for splitting a current block; and selecting a set of coefficients of an interpolation filter based on the information of ISP, wherein the set of coefficients of the interpolation filter is fG coefficients (also called as smoothing filter) or fC coefficients (also called as non-smoothing filter). The method further includes obtaining predicted samples of the current block by applying the set of coefficients to reference samples.

As an implementation of the first aspect, the information of ISP may be indicated by IntraSubPartitionsSplitType. ISP is used (i.e., ISP is on) for splitting the current block when IntraSubPartitionsSplitType!=ISP_NO_SPLIT.

As an implementation of the first aspect, when the information of ISP indicates ISP is used for splitting the current block, a block filtering state is no-smoothing state. The block filtering state may be indicated by a flag smoothState, and the block filtering state is no-smoothing state when the value of smoothState is 0. The value of filterFlag is equal to the value of smoothState, i.e., 0. Correspondingly, fC coefficients will be selected.

A second aspect of the invention relates to a method of intra prediction of a block of a picture. The method includes: detecting a block filtering state (i.e., smoothing state of the block) based on information of Intra Sub-Partitions (ISP), wherein the block filtering state includes no-smoothing state, smoothing state, or direction-dependent smoothing state; and selecting a set of coefficients of an interpolation filter based on the value of the block filtering state, wherein the set of coefficients of the interpolation filter is fG coefficients or fC coefficients. The method further includes obtaining predicted samples of the current block by applying the set of coefficients to reference samples.

As an implementation of the second aspect, the information of ISP may be indicated by IntraSubPartitionsSplitType. ISP is used (i.e., ISP is on) for splitting the current block when IntraSubPartitionsSplitType!=ISP_NO_SPLIT. When the information of ISP indicates ISP is used for splitting the current block, a block filtering state is no-smoothing state. The block filtering state may be indicated by a flag smoothState, and the block filtering state is no-smoothing state when the value of smoothState is 0.

As an implementation of the second aspect, the selecting the set of coefficients of the interpolation filter comprises: determining a filter flag (filterFlag) based on the block filtering state, wherein the value of filterFlag indicates the set of coefficients of the interpolation filter is fG coefficients or fC coefficients; and selecting the set of coefficients of the interpolation filter based on the value of the filter flag.

As an implementation of the second aspect, the value of a filter flag (filterFlag) may be used to indicate the set of coefficients of the interpolation filter is fG coefficients or fC coefficients. The value of filterFlag is equal to the value of smoothState. That means the value of filterFlag is 0 when the block filtering state is no-smoothing state. Correspondingly, fC coefficients will be selected.

A third aspect of the invention relates to a method of intra prediction of a block of a picture. The method comprises obtaining predicted samples of the block by applying interpolation filter to reference samples, wherein a set of coefficients of the interpolation filter is determined on the basis of a decision (also referred to as "block filtering states") that comprises the following steps performed for each of the smoothing mechanisms:
  obtaining value of a flag that indicates whether an intra-prediction mechanism is applied; and
  comparing the value of the obtained flag (for example, intraSubPartitionSplitType) with a predetermined binary value (for example, ISP_NO_SPLIT);
and wherein the determination of a set of coefficient is performed by selecting one of the predetermined sets of coefficients, the selection is based on the decision which is the result of the comparing of the values of the obtained flags with a predetermined binary value.

As an implementation of the third aspect, two predetermined sets of coefficients are defined: the first set (fC) and the second set (fG), and wherein the selecting of one of the predetermined sets of coefficients is based on the decision, the decision is a binary value that is derived from the results of the comparing the value of the obtained flag with a predetermined binary value; when decision is 1, the first set is selected, and when decision is 0, the second set is selected.

The method according to the first aspect of the invention can be performed by the device according to the fourth aspect of the invention. The device includes an obtaining unit, a selecting unit, and a predicting unit. The obtaining unit, configured to obtain information of Intra Sub-Partitions (ISP), wherein the information of ISP indicates whether ISP is used for splitting a current block. The selecting unit, configured to select a set of coefficients of an interpolation filter based on the information of ISP, wherein the set of coefficients of the interpolation filter is fG coefficients or fC coefficients. The predicting unit, configured to obtain predicted samples of the current block by applying the set of coefficients to reference samples.

The method according to the second aspect of the invention can be performed by the device according to the fifth aspect of the invention. The device includes a detecting unit, a selecting unit, and a predicting unit. The detecting unit, configured to detect a block filtering state based on information of Intra Sub-Partitions (ISP), wherein the block filtering state includes no-smoothing state, smoothing state, or direction-dependent smoothing state. The selecting unit, configured to select a set of coefficients of an interpolation filter based on the value of the block filtering state, wherein the set of coefficients of the interpolation filter is fG coefficients or fC coefficients. The predicting unit, configured to obtain predicted samples of the current block by applying the set of coefficients to reference samples. Further features and implementation forms of the method according to the second aspect of the invention correspond to the features and implementation forms of the apparatus according to the fifth aspect of the invention.

The method according to the third aspect of the invention can be performed by the device according to the sixth aspect of the invention. Further features and implementation forms of the method according to the third aspect of the invention correspond to the features and implementation forms of the apparatus according to the sixth aspect of the invention.

According to a seventh aspect the invention relates to an apparatus for decoding a video stream includes a processor and a memory. The memory is storing instructions that cause the processor to perform the method according to the first, second or third aspect or any possible implementation of the first, second or third aspect.

According to an eighth aspect the invention relates to an apparatus for encoding a video stream includes a processor and a memory. The memory is storing instructions that cause the processor to perform the method according to the first, second or third aspect or any possible implementation of the first, second or third aspect.

According to a ninth aspect, a computer-readable storage medium having stored thereon instructions that when executed cause one or more processors configured to code video data is proposed. The instructions cause the one or more processors to perform a method according to the first, second or third aspect or any possible implementation of the first, second or third aspect.

According to a tenth aspect, the invention relates to a computer program comprising program code for performing the method according to the first, second or third aspect or any possible implementation of the first, second or third aspect when executed on a computer.

As discussed above, when the information of ISP indicates whether ISP is used for splitting a current block (i.e., ISP is on), aspects or implementations of the aspects remove mode dependency during selection of interpolation filter type. This could increase encoding or decoding efficiency.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

Figure 1A:
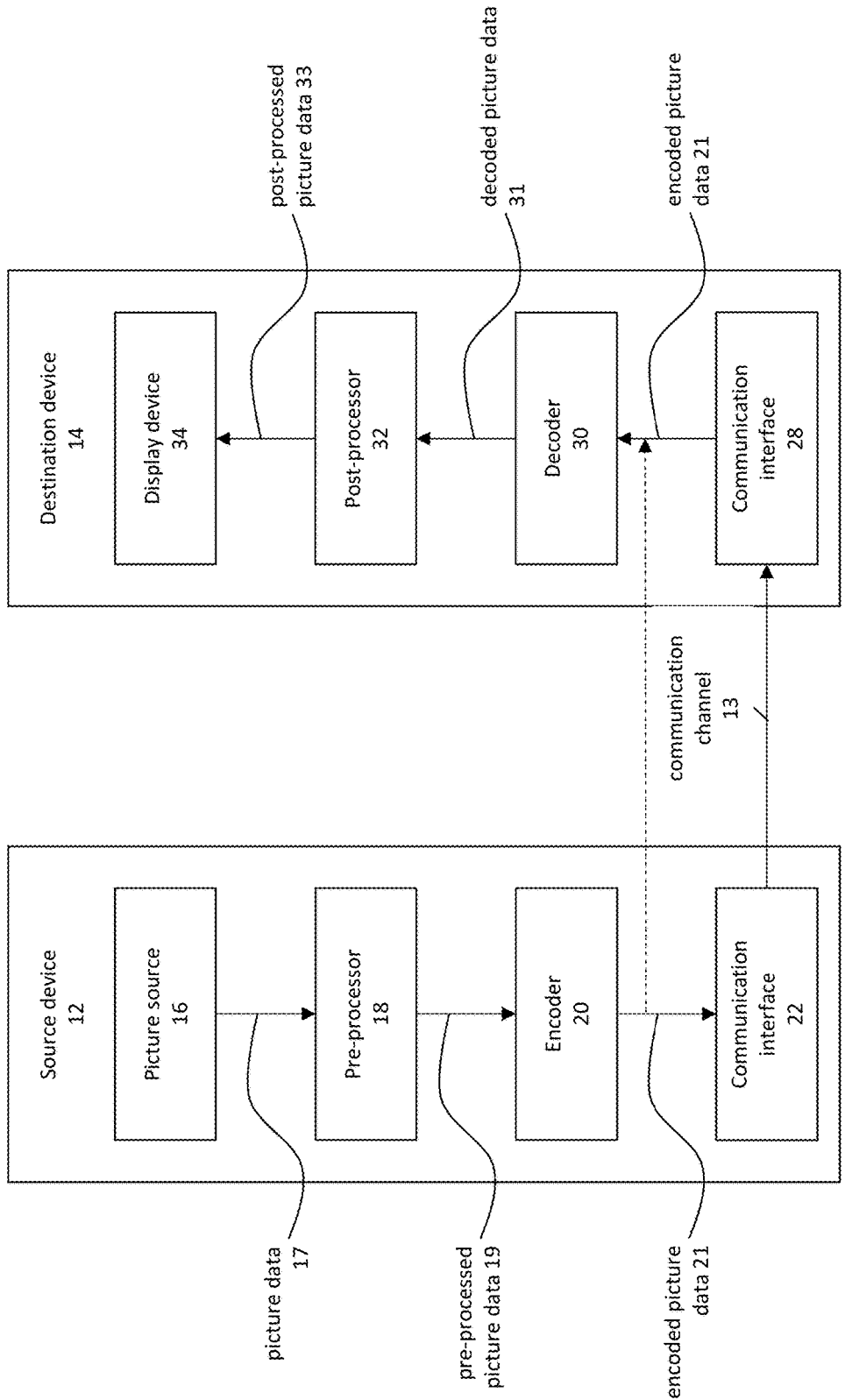
FIG. 1A is a block diagram showing an example of a video coding system configured to implement embodiments of the invention.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
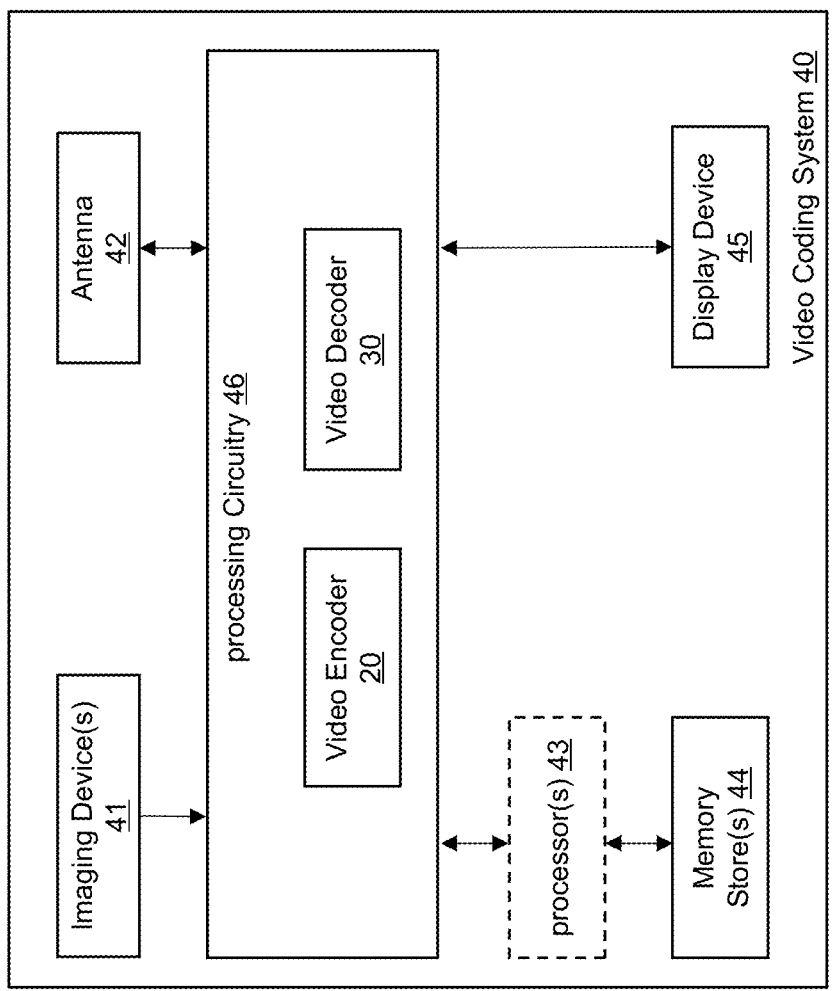
FIG. 1B is a block diagram showing another example of a video coding system configured to implement embodiments of the invention.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Encoder and Encoding Method

Figure 2:
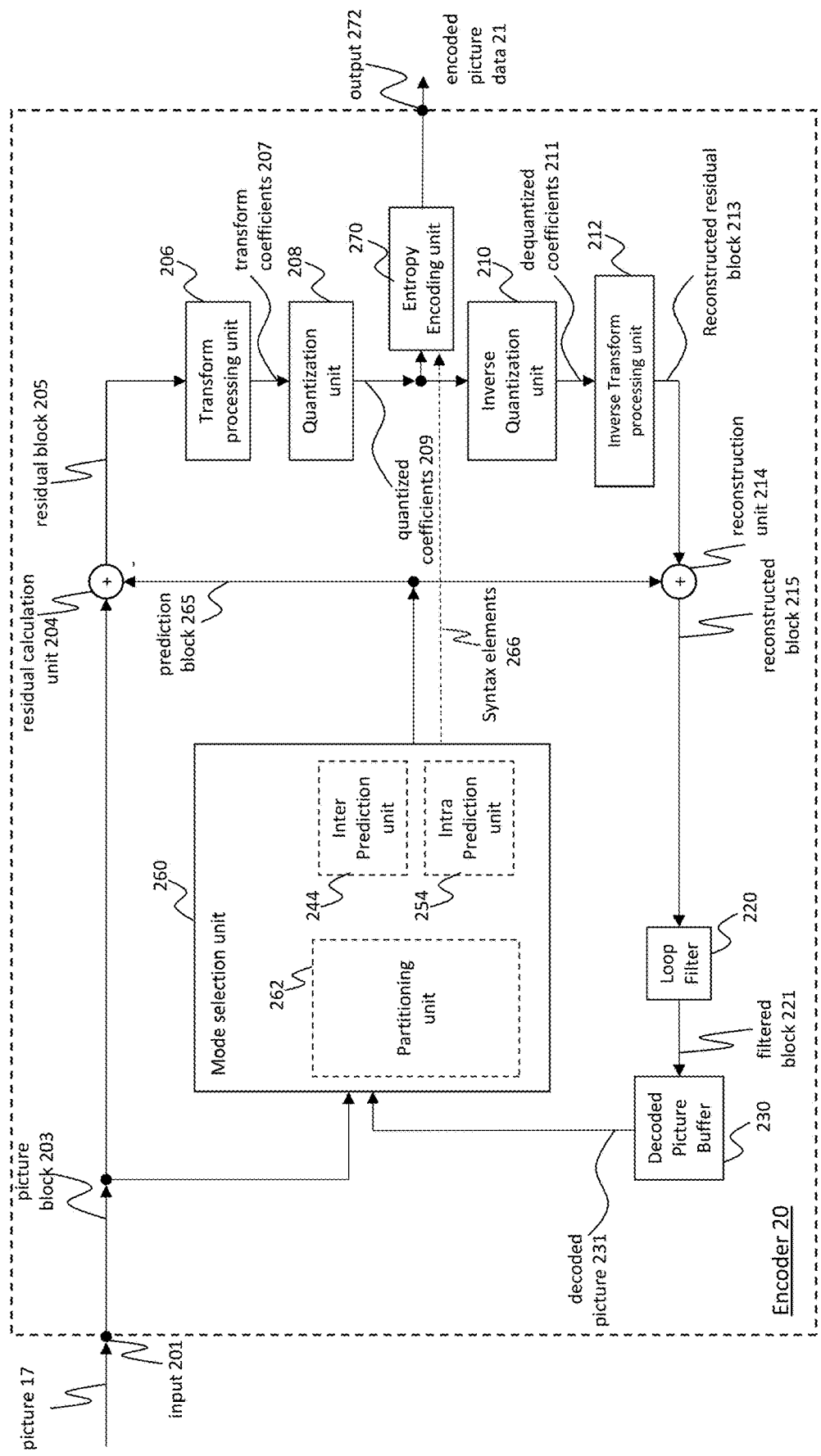
FIG. 2 is a block diagram showing an example of a video encoder configured to implement embodiments of the invention.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
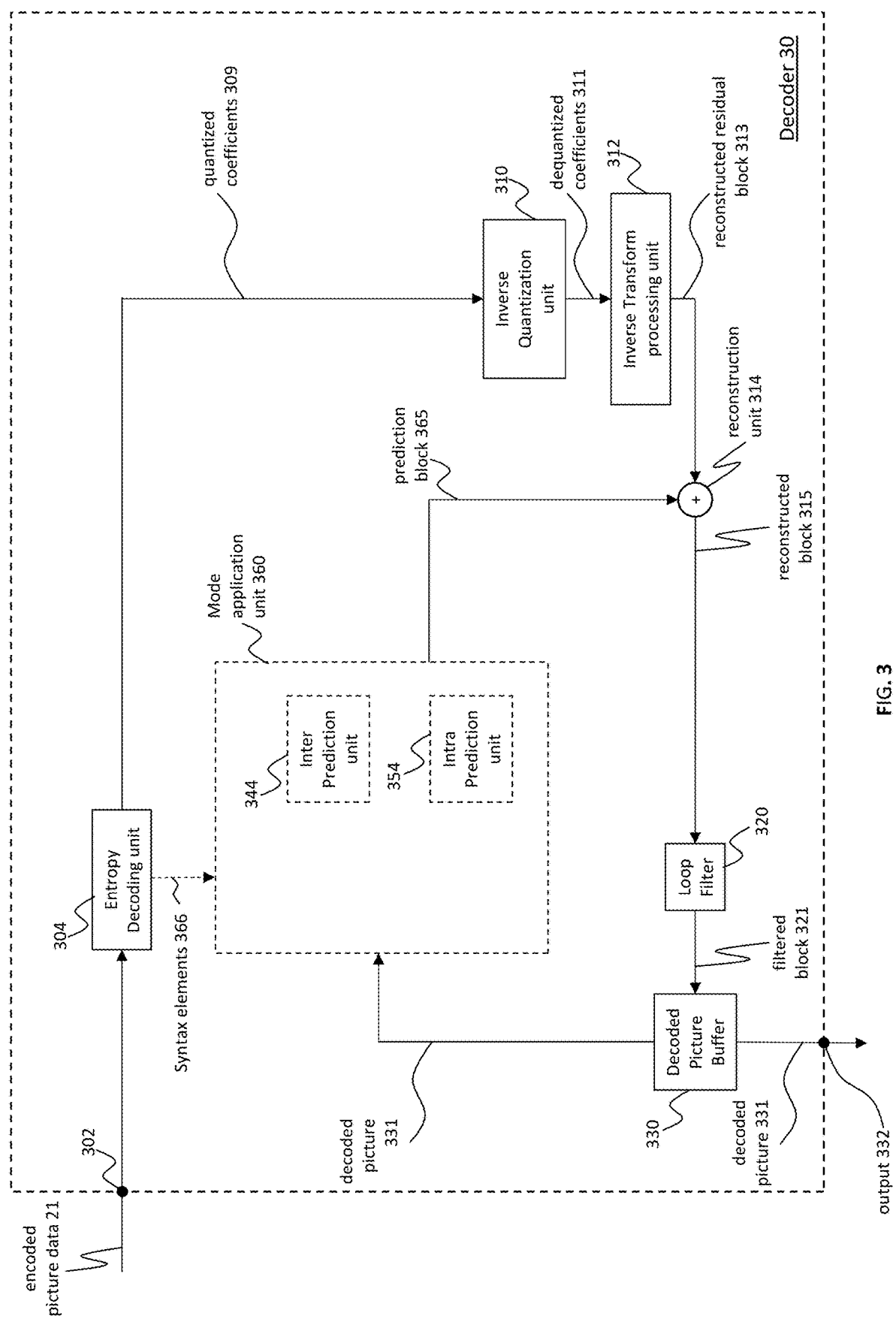
FIG. 3 is a block diagram showing an example structure of a video decoder configured to implement embodiments of the invention.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters filter or a collaborative filter, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, a context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters filter or a collaborative filter, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2\wedge(\text{bitDepth}-1) \sim 2\wedge(\text{bitDepth}-1)-1$, where "$\wedge$" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux = (mvx + 2^{bitDepth}) \% 2^{bitDepth} \quad (1)$$

$$mvx = (ux >= 2^{bitDepth-1}) ? (ux - 2^{bitDepth}) : ux \quad (2)$$

$$uy = (mvy + 2^{bitDepth}) \% 2^{bitDepth} \quad (3)$$

$$mvy = (uy >= 2^{bitDepth-1}) ? (uy - 2^{bitDepth}) : uy \quad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux=(mvpx+mvdx+2^{bitDepth})\%2^{bitDepth} \quad (5)$$

$$mvx=(ux>=2^{bitDepth-1})?(ux-2^{bitDepths}):ux \quad (6)$$

$$uy=(mvpy+mvdy+2^{bitDepth})\%2^{bitDepth} \quad (7)$$

$$mvy=(uy>=2^{bitDepth-1})?(uy-2^{bitDepth}):uy \quad (8)$$

The operations may be applied during the sum of mvp and mvd, as shown in formula (5) to (8).

Method 2: remove the overflow MSB by clipping the value $$vx=\text{Clip3}(-2^{bitDepth-1}, 2^{bitDepth-1}-1, vx)$$

$$vy=\text{Clip3}(-2^{bitDepth-1}, 2^{bitDepth-1}-1, vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$Clip3(x, y, z) = \begin{cases} x; & z < x \\ y; & z > y \\ z; & \text{otherwise} \end{cases}$$

Figure 4:
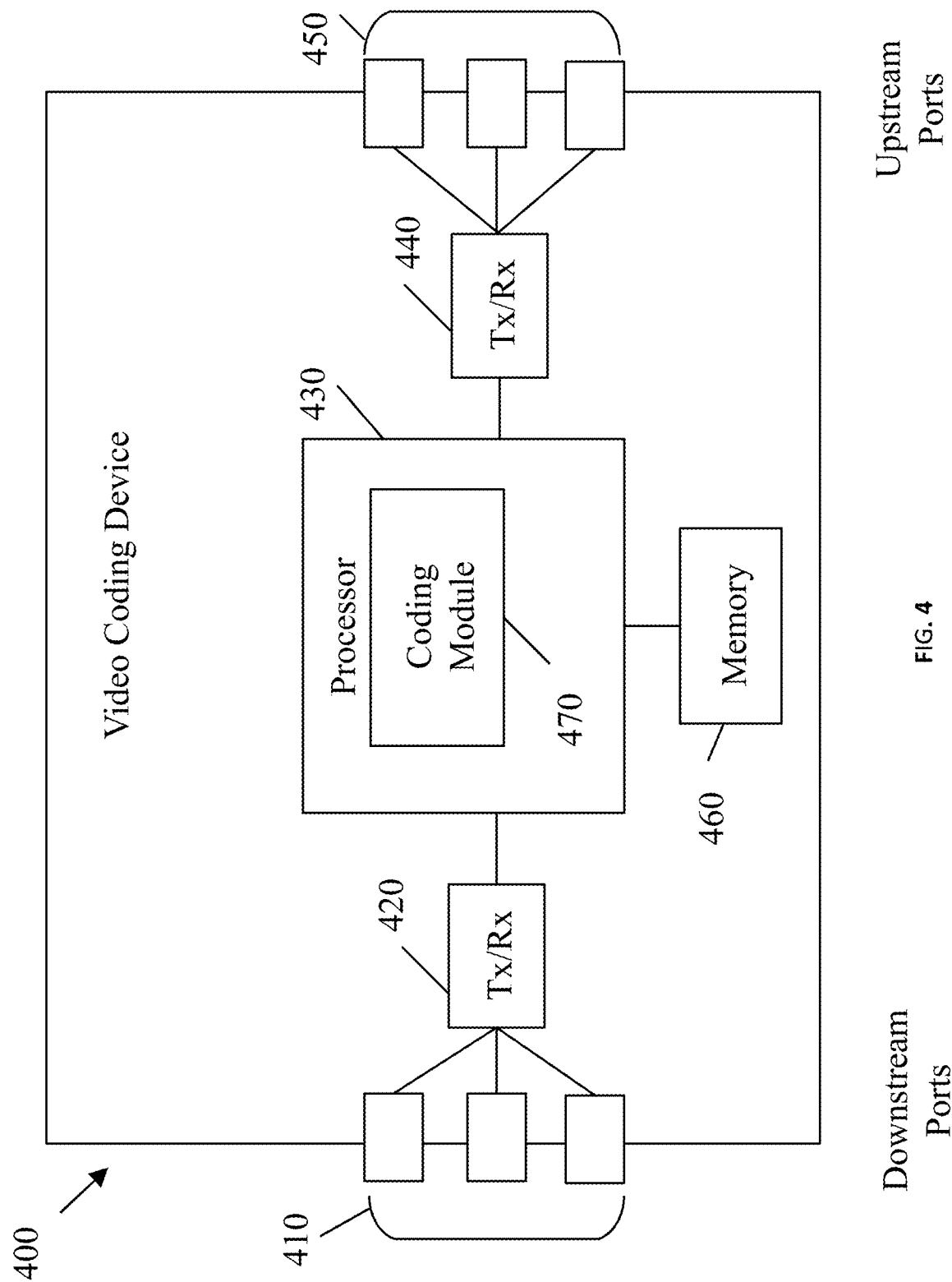
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
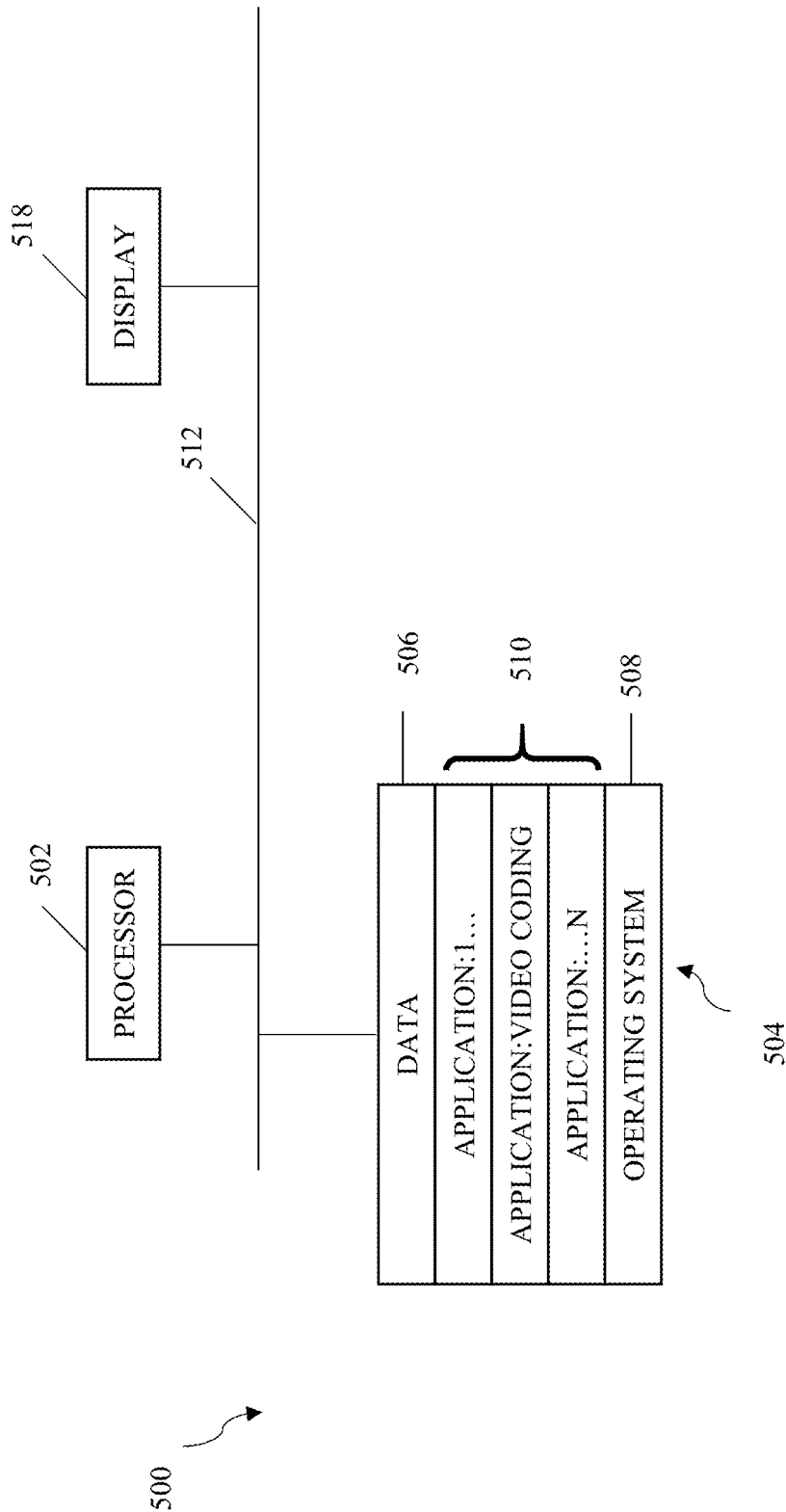
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Figure 6:
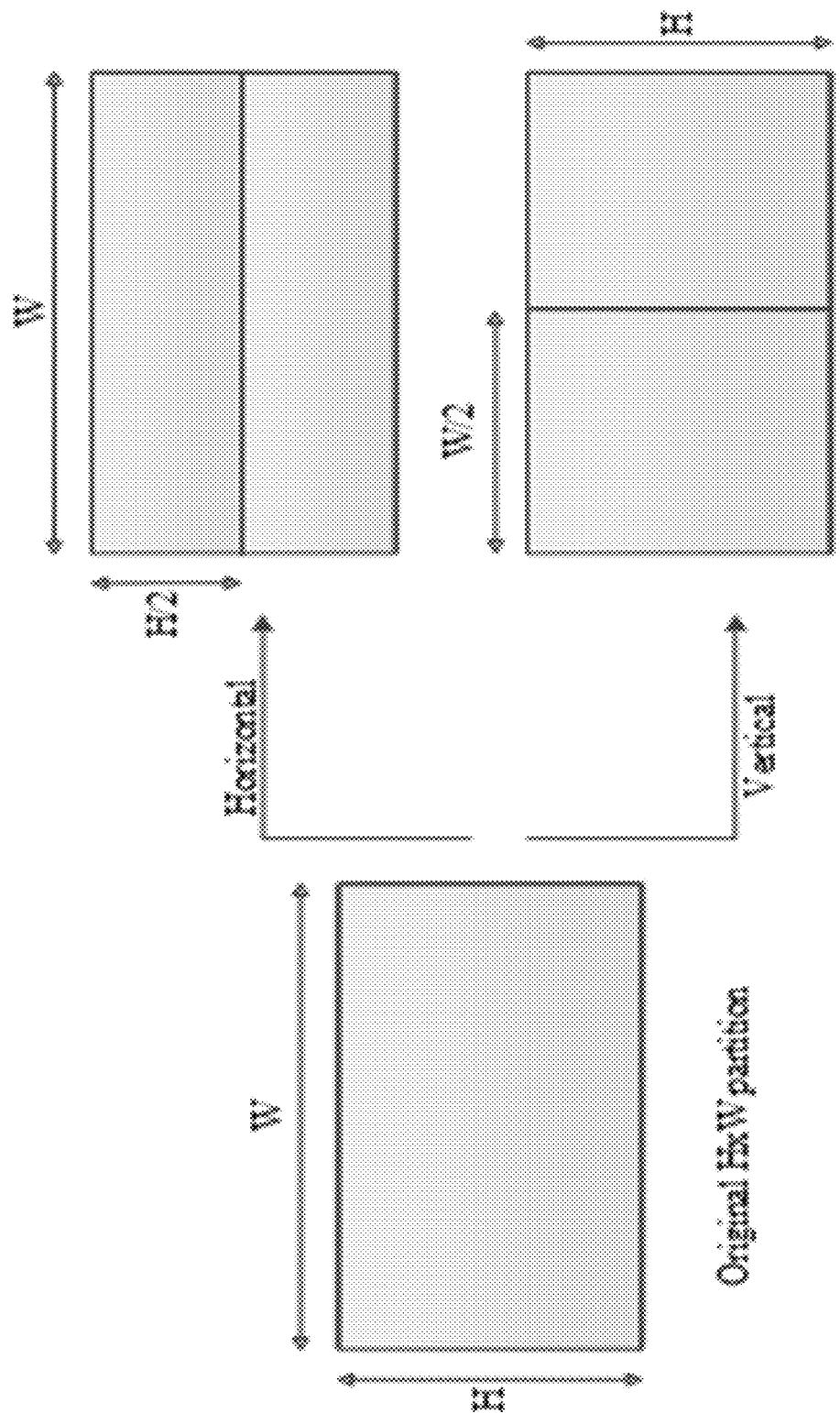
FIG. 6 is an illustration of two subpartitions split in ISP tool.
Figure 7:
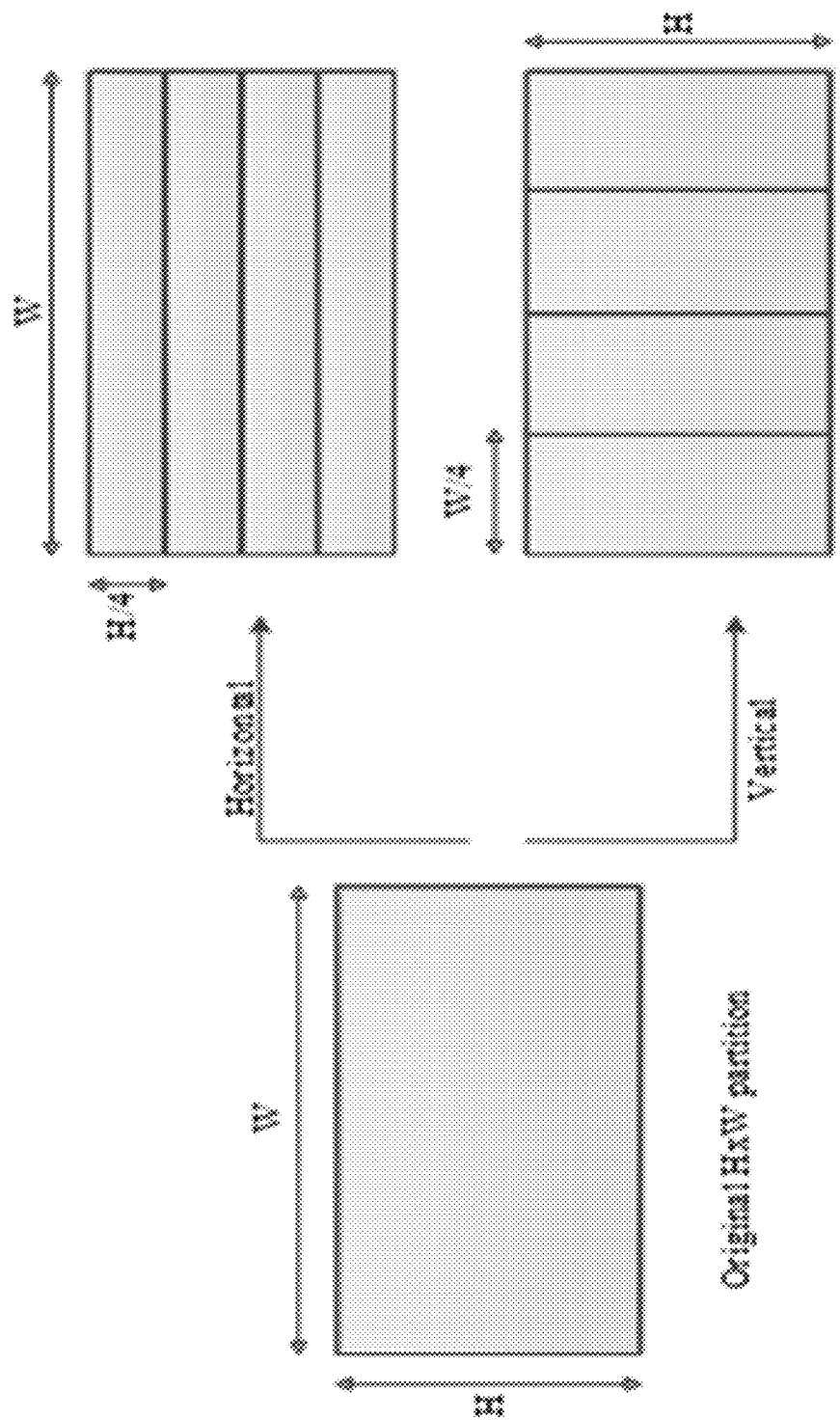
FIG. 7 is an illustration of four subpartitions split in ISP tool.

Details of the intra sub-partition (ISP) tool could be found in JVET-M0102, Brief description of this tool is given below:

The ISP tool divides luma intra-predicted blocks vertically or horizontally into 2 or 4 sub-partitions depending on the block size dimensions, as shown in table 1. FIGS. 6 and 7 show examples of the two possibilities. All sub-partitions fulfill the condition of having at least 16 samples.

TABLE 1

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

For each of these sub-partitions, a residual signal is generated by entropy decoding the coefficients sent by the encoder and then inverse quantizing and inverse transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Figure 8:
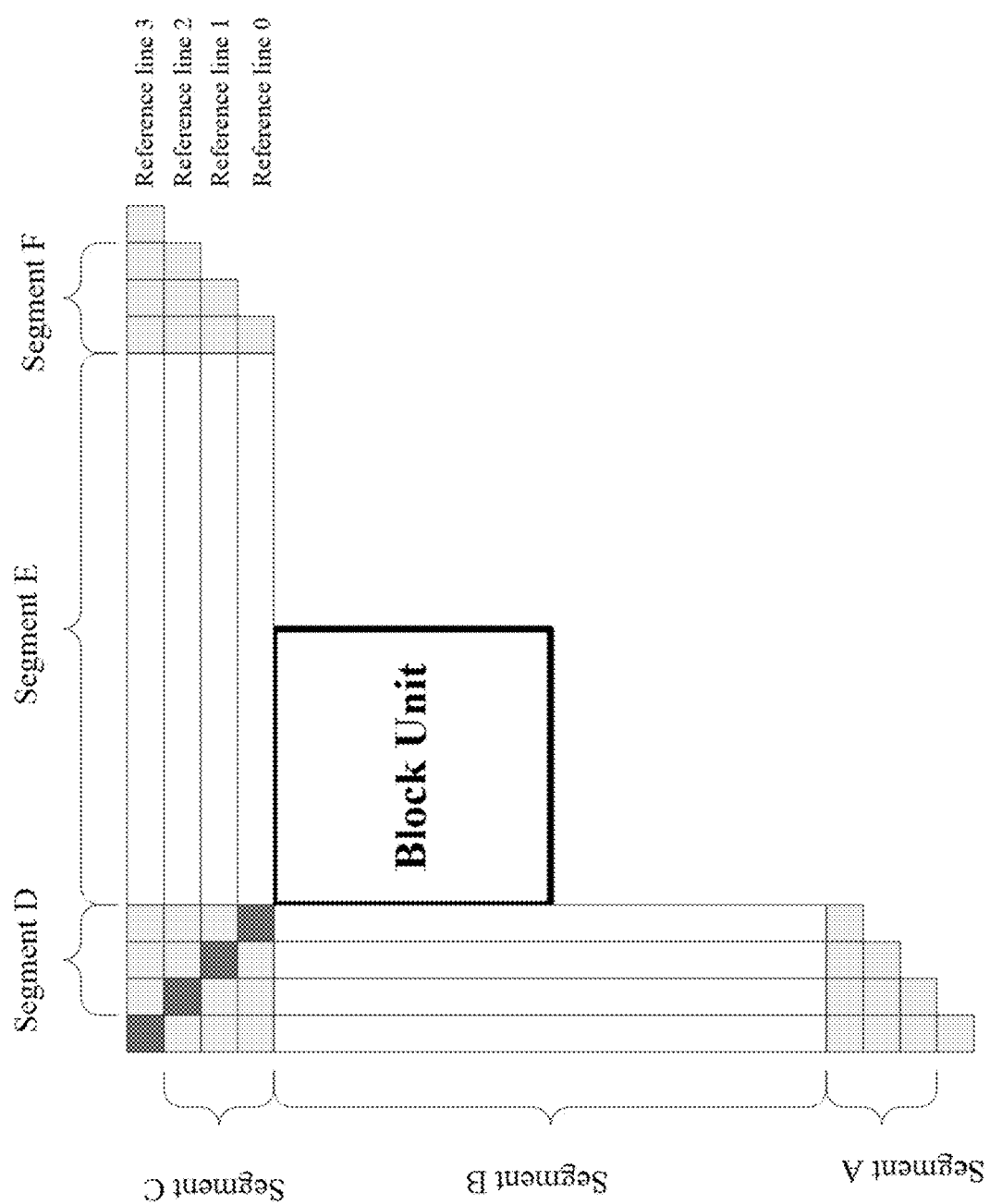
FIG. 8 is an illustration of multi-reference line intra prediction.

Based on the intra mode and the split utilized, two different classes of processing orders are used, which are referred to as normal and reversed order. In the normal order, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards. FIG. 8 shows positions of lines of reference samples that are used for intra prediction of a block. Depending on the index of the reference line ("Reference line"), samples of the predicted block ("Block unit") may be predicted using reference samples that are not adjacent to the predicted block, i.e. when the index of reference line is not equal to zero.

Planar intra prediction mode is specified in VVC Draft as follows:
Inputs to this process are:
a variable nTbW specifying the transform block width,
a variable nTbH specifying the transform block height,
the neighbouring samples p[x][y], with x=−1, y=−1 . . . nTbH and x=0 . . . nTbW, y=−1.
Outputs of this process are the predicted samples predSamples[x][y], with x=0 . . . nTbW−1, y=0 . . . nTbH−1.
The variables nW and nH are derived as follows:

$$nW=\text{Max}(nTbW,2)$$

$$nH=\text{Max}(nTbH,2)$$

The values of the prediction samples predSamples[x][y], with x=0 . . . nTbW−1 and y=0 . . . nTbH−1, are derived as follows:

$$predV[x][y]=((nH-1-y)*p[x][-1]+(y+1)*p[-1][nTbH])<<\text{Log }2(nW)$$

$$predH[x][y]=((nW-1-x)*p[-1][y]+(x+1)*p[nTbW][-1])<<\text{Log }2(nH)$$

$$predSamples[x][y]=(predV[x][y]+predH[x][y]+nW*nH)>>(\text{Log }2(nW)+\text{Log }2(nH)+1)$$

DC intra prediction process is specified in VVC draft as follows:
Inputs to this process are:
a variable nTbW specifying the transform block width,
a variable nTbH specifying the transform block height,
the neighbouring samples p[x][y], with x=−1, y=−1 . . . nTbH−1 and x=0 . . . nTbW−1, y=−1.
Outputs of this process are the predicted samples predSamples[x][y], with x=0 . . . nTbW−1, y=0 . . . nTbH−1.
The values of the prediction samples predSamples[x][y], with x=0 . . . nTbW−1, y=0 . . . nTbH−1, are derived by the following ordered steps:
1. A variable dcVal is derived as follows:
When nTbW is equal to nTbH:

$$dcVal=(\Sigma_{x'=0}^{nTbW-1}p[x'][-1]+\Sigma_{y'=0}^{nTbH-1}p[-1][y']+nTbW)>>(\text{Log }2(nTbW)+1)$$

When nTbW is greater than nTbH:

$$dcVal=(\Sigma_{x'=0}^{nTbW-1}p[x'][-1]+(nTbW>>1))>>\text{Log }2(nTbW)$$

When nTbW is less than nTbH:

$$dcVal=(\Sigma_{y'=0}^{nTbH-1}p[-1][y']+(nTbH>>1))>>\text{Log }2(nTbH)$$

2. The prediction samples predSamples[x][y] are derived as follows:

predSamples[x][y]=dcVal, with x=0. . . nTbW−1, y=0. . . nTbH−1

The state of the art methods use directional intra prediction only when the index of reference line is non-zero, i.e. DC intra prediction mode and PLANAR intra prediction mode are disabled in this case.

Another case when DC intra prediction mode is not performed is when intra sub-partitioning (ISP) is in use.

Version of the VVC draft specifies different coding of intra prediction mode. Selection of the sequence of syntax elements signaled in the bitstream depends on the particular tools being turned enabled or disabled. In specific, mpm flag is signaled only when "intra_luma_ref_idx" flag and "intra_subpartitions_mode_flag" flags are equal to zero (see Table 2).

TABLE 2

Coding of intra mode index as specified by coding unit syntax in VVC specification text draft version 4 revision 7.

```
if( treeType = = SINGLE_TREE || treeType = = DUAL_TREE_
LUMA ) {
    if( ( y0 % CtbSizeY ) > 0 )
        intra_luma_ref_idx[ x0 ][ y0 ]                              ae(v)
    if (intra_luma_ref_idx[ x0 ][ y0 ] = = 0 &&
        ( cbWidth <= MaxTbSizeY ||cbHeight <= MaxTbSizeY ) &&
        ( cbWidth * cbHeight > MinTbSizeY * MinTbSizeY ))
        intra_subpartitions_mode_flag[ x0 ][ y0 ]                   ae(v)
    if( intra_subpartitions_mode_flag[ x0 ][ y0 ] = = 1 &&
        cbWidth <= MaxTbSizeY && cbHeight <= MaxTbSizeY )
        intra_subpartitions_split_flag[ x0 ][ y0 ]                  ae(v)
    if( intra_luma_ref_idx[ x0 ][ y0 ] = = 0 &&
        intra_subpartitions_mode_flag[ x0 ][ y0 ] = = 0 )
        intra_luma_mpm_flag[ x0 ][ y0 ]                             ae(v)
    if( intra_luma_mpm_flag[ x0 ][ y0 ] )
        intra_luma_mpm_idx[ x0 ][ y0 ]                              ae(v)
    else
        intra_luma_mpm_remainder[ x0 ][ y0 ]                        ae(v)
}
if( treeType = = SINGLE_TREE || treeType = = DUAL_TREE_
CHROMA )
    intra_chroma_pred_mode[ x0 ][ y0 ]                              ae(v)
```

Currently, several versions of MPM list are maintained in VVC software and specification draft. Hardware design that uses several MPM lists is also not desirable. However, if to enable intra prediction modes for the cases when they are currently disabled, it would result in two combinations of intra flags producing similar intra predicted blocks. Evidently, this design is redundant and to resolve this issue either signaling or intra prediction part should be modified.

The scope of embodiments is in modification of PLANAR and DC intra prediction processes for the cases where reference samples are not adjacent to the block being predicted or a block to be predicted is further split (e.g. using ISP). Modifications include not only the process of prediction samples determination, but reference sample filtering and position-dependent intra prediction combination (PDPC).

Purpose of such modification is in the possibility to have a unified intra mode signaling mechanism for all the intra prediction tools.

The embodiments propose to modify processing of reference samples and introduce conditional switching of PDPC in cases when DC or PLANAR intra prediction modes are used and when reference samples are not adjacent to the block being predicted or when a predicted block is subject to further split (i.e. in case of ISP). Processing includes selection of the reference samples from the reconstructed samples in the top and left area (as shown in FIG. 8) and their filtering.

The embodiments are aimed at providing a possibility to have a single unified signaling mechanism to encode intra prediction mode. Exemplary unified signaling method of intra prediction mode coding is given in Table 3.

TABLE 3

Exemplary unified coding of intra mode index.

```
if( treeType = = SINGLE_TREE || treeType = = DUAL_TREE_
LUMA ) {
  if( ( y0 % CtbSizeY ) > 0 )
    intra_luma_ref_idx[ x0 ][ y0 ]                              ae(v)
  if (intra_luma_ref_idx[ x0 ][ y0 ] = = 0 &&
    ( cbWidth <= MaxTbSizeY ||cbHeight <= MaxTbSizeY ) &&
    ( cbWidth * cbHeight > MinTbSizeY * MinTbSizeY ))
    intra_subpartitions_mode_flag[ x0 ][ y0 ]                   ae(v)
  if( intra_subpartitions_mode_flag[ x0 ][ y0 ] = = 1 &&
    cbWidth <= MaxTbSizeY && cbHeight <= MaxTbSizeY )
    intra_subpartitions_split_flag[ x0 ][ y0 ]                  ae(v)
    intra_luma_mpm_flag[ x0 ][ y0 ]                             ae(v)
  if( intra_luma_mpm_flag[ x0 ][ y0 ] )
    intra_luma_mpm_idx[ x0 ][ y0 ]                              ae(v)
  else
    intra_luma_mpm_remainder[ x0 ][ y0 ]                        ae(v)
}
if( treeType = = SINGLE_TREE || treeType = = DUAL _TREE_
CHROMA )
  intra_chroma_pred_mode[ x0 ][ y0 ]                            ae(v)
```

The difference between coding methods shown in Table 2 and Table 3 is that conditional signaling of infra_luma_mpm_flag is removed in the proposed exemplary syntax.

Figure 9:
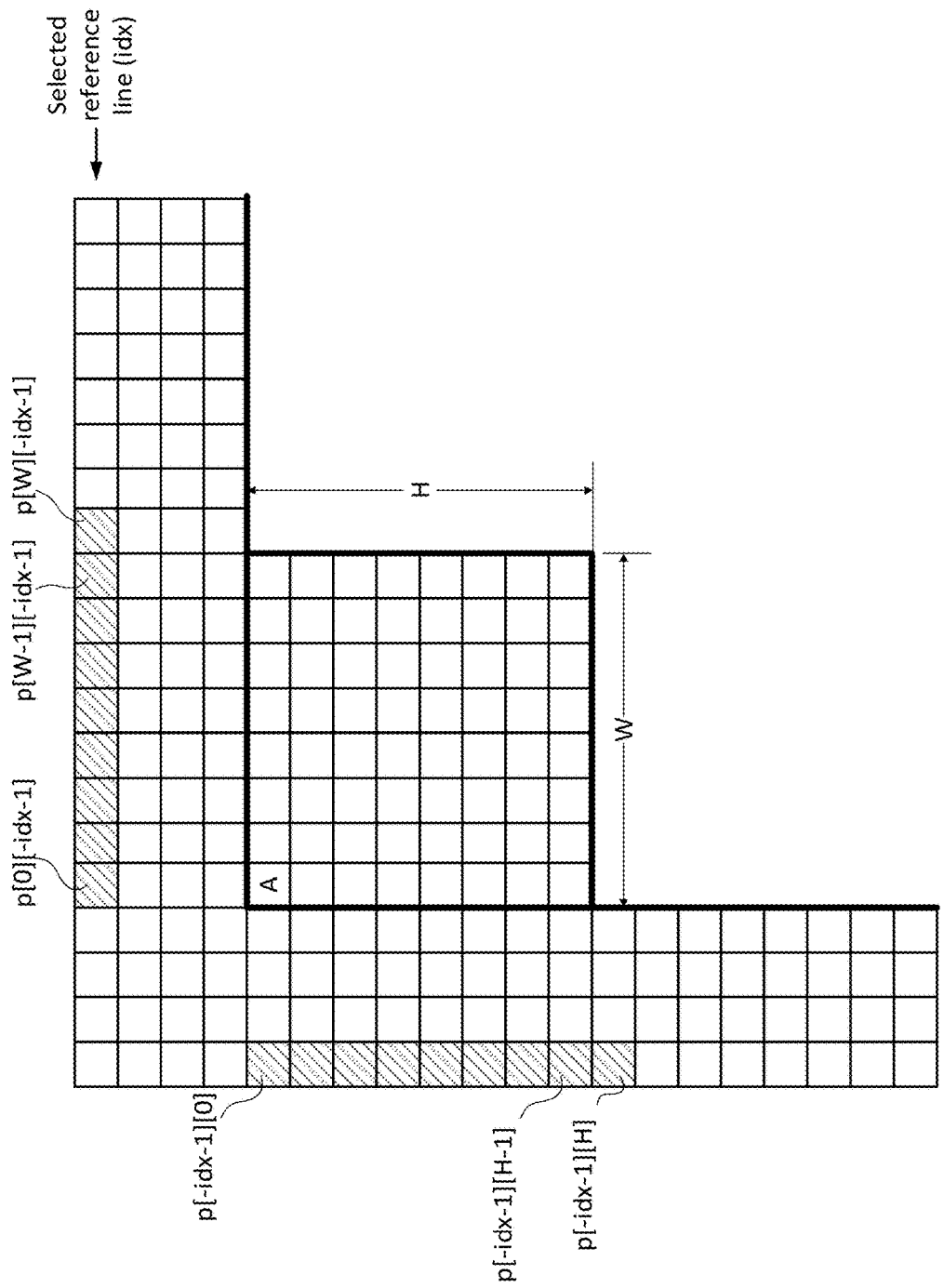
FIG. 9-FIG. 11 illustrate different reference sample selection methods for PLANAR intra prediction mode.

From the specification it could be noticed that PLANAR intra prediction mode is unable to operate when the index of reference line is non-zero. An embodiment of the invention shown in FIG. 9 discloses how this could be handled. In this Figure, the case when the 3$^{rd}$ reference line is used. Reference samples that are selected for PLANAR intra prediction mode are represented by hatch fill-ed squared. Assuming the position of the first top-left sample (denoted as "A") equal to (0, 0), PLANAR intra prediction could be modified as follows:

Inputs to this process are:
a variable refIdx specifying the intra prediction reference line index,
a variable nTbW specifying the transform block width,
a variable nTbH specifying the transform block height,
the reference samples p[x][y], with x=−1−refIdx, y=−refIdx . . . nTbH and x=−refIdx . . . nTbW, y=−1−refIdx.

Outputs of this process are the predicted samples predSamples[x][y], with x=0 . . . nTbW−1, y=0 . . . nTbH−1.

The variables nW and nH are derived as follows:

$nW=\mathrm{Max}(nTbW,2)$ $nH=\mathrm{Max}(nTbH,2)$

Figure 10:
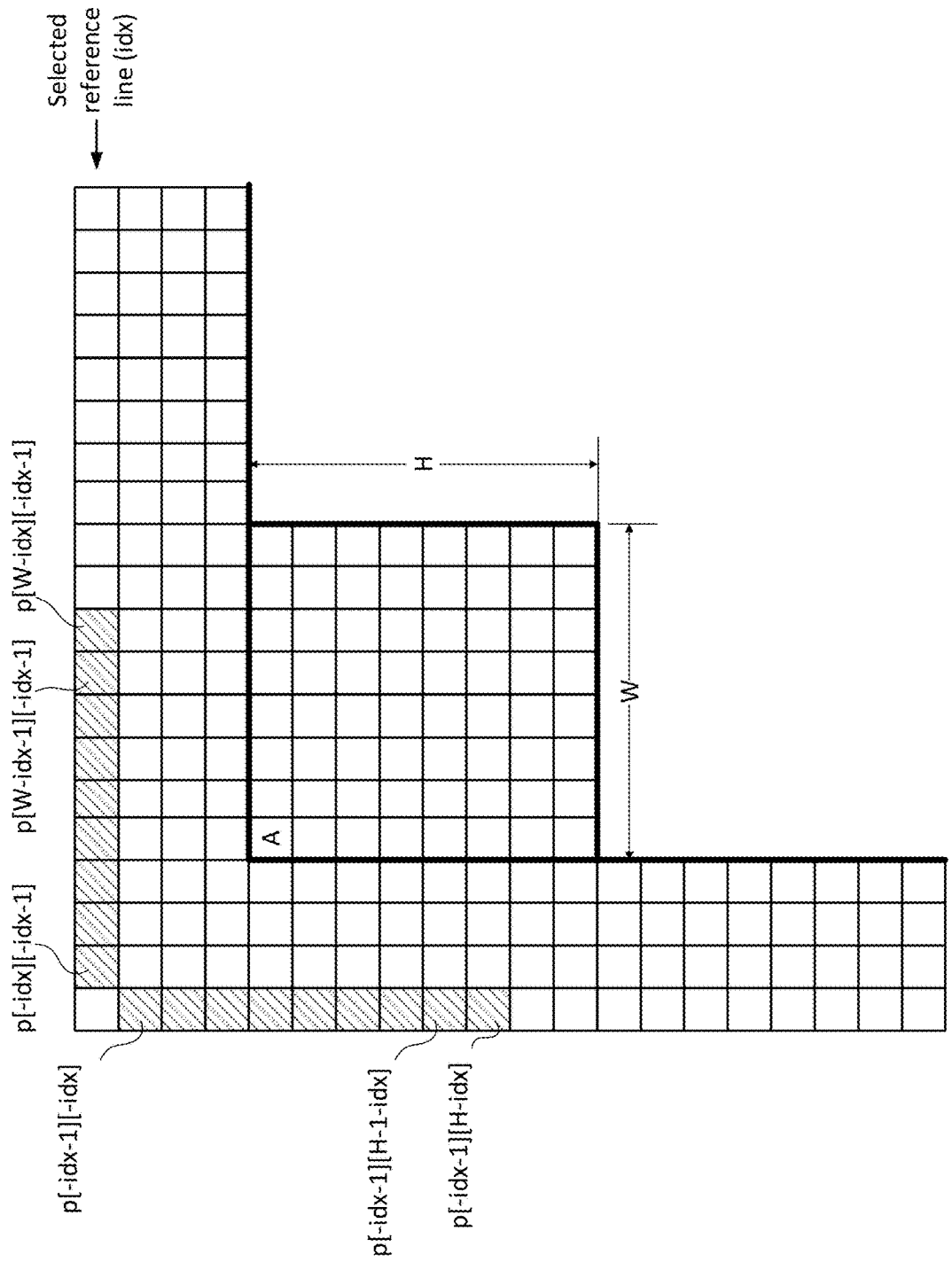

The values of the prediction samples predSamples[x][y], with x=0 . . . nTbW−1 and y=0 . . . nTbH−1, are derived as follows:

$\mathrm{pred}V[x][y]=((nH-1-y)*p[x][-1-\mathrm{refIdx}]+(y+1)*p[-1-\mathrm{refIdx}][nTbH])<<\mathrm{Log}\ 2(nW)$ $\mathrm{pred}H[x][y]=((nW-1-x)*p[-1-\mathrm{refIdx}][y]+(x+1)*p[nTbW][-1-\mathrm{refIdx}])<<\mathrm{Log}\ 2(nH)$ $\mathrm{predSamples}[x][y]=(\mathrm{pred}V[x][y]+\mathrm{pred}H[x][y]+nW*nH)>>(\mathrm{Log}\ 2(nW)+\mathrm{Log}\ 2(nH)+1)$ Alternative embodiment shown in FIG. 10 discloses another method of selecting reference samples from the reference line for PLANAR intra prediction mode. This method could be described as follows.

Inputs to this process are:
a variable refIdx specifying the intra prediction reference line index,
a variable nTbW specifying the transform block width,
a variable nTbH specifying the transform block height,
the neighbouring samples p[x][y], with x=−1−refIdx, y=−1−refIdx . . . nTbH−refIdx and x=−refIdx . . . nTbW−refIdx, y=−1−refIdx . . . .

Outputs of this process are the predicted samples predSamples[x][y], with x=0 . . . nTbW−1, y=0 . . . nTbH−1.

The variables nW and nH are derived as follows:

$nW=\mathrm{Max}(nTbW,2)$ $nH=\mathrm{Max}(nTbH,2)$

Figure 11:
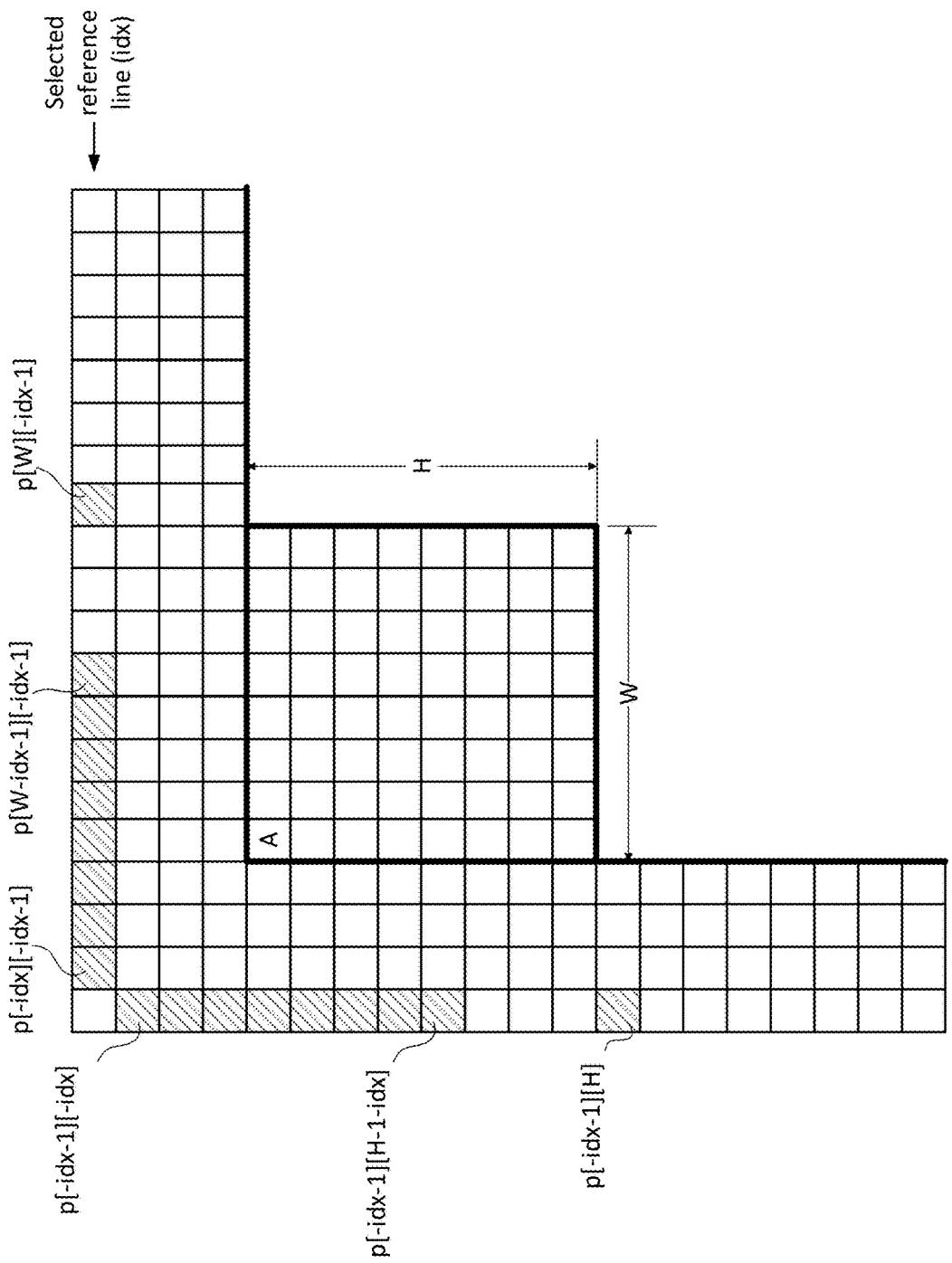

The values of the prediction samples predSamples[x][y], with x=0 . . . nTbW−1 and y=0 . . . nTbH−1, are derived as follows:

$\mathrm{pred}V[x][y]=((nH-1-y)*p[x-\mathrm{refIdx}][-1-\mathrm{refIdx}]+(y+1)*p[-1-\mathrm{refIdx}][nTbH-\mathrm{refIdx}])<<\mathrm{Log}\ 2(nW)$ $\mathrm{pred}H[x][y]=((nW-1-x)*p[-1-\mathrm{refIdx}][y-\mathrm{refIdx}]+(x+1)*p[nTbW-\mathrm{refIdx}][-1-\mathrm{refIdx}])<<\mathrm{Log}\ 2(nH)$ $\mathrm{predSamples}[x][y]=(\mathrm{pred}V[x][y]+\mathrm{pred}H[x][y]+nW*nH)>>(\mathrm{Log}\ 2(nW)+\mathrm{Log}\ 2(nH)+1)$ Another alternative embodiment consists in applying a special displacement for the two samples the values of which are used in bi-prediction as bottom-line sample value and right-side sample value, respectively. In FIG. 11 it could be noticed that reference samples are selected from the reference line with a gap. Specification text for this embodiment could be as follows:

Inputs to this process are:
a variable refIdx specifying the intra prediction reference line index,
a variable nTbW specifying the transform block width,
a variable nTbH specifying the transform block height,
the neighbouring samples p[x][y], with x=−1−refIdx, y=−1−refIdx . . . nTbH−refIdx and x=−refIdx . . . nTbW−refIdx, y=−1−refIdx . . . .

Outputs of this process are the predicted samples predSamples[x][y], with x=0 . . . nTbW−1, y=0 . . . nTbH−1.

The variables nW and nH are derived as follows:

$nW=\mathrm{Max}(nTbW,2)$ $nH=\mathrm{Max}(nTbH,2)$

The values of the prediction samples predSamples[x][y], with x=0 . . . nTbW−1 and y=0 . . . nTbH−1, are derived as follows:

$\mathrm{pred}V[x][y]=((nH-1-y)*p[x-\mathrm{refIdx}][-1-\mathrm{refIdx}]+(y+1)*p[-1-\mathrm{refIdx}][nTbH])<<\mathrm{Log}\ 2(nW)$ $\mathrm{pred}H[x][y]=((nW-1-x)*p[-1-\mathrm{refIdx}][y-\mathrm{refIdx}]+(x+1)*p[nTbW][-1-\mathrm{refIdx}])<<\mathrm{Log}\ 2(nH)$ $\mathrm{predSamples}[x][y]=(\mathrm{pred}V[x][y]+\mathrm{pred}H[x][y]+nW*nH)>>(\mathrm{Log}\ 2(nW)+\mathrm{Log}\ 2(nH)+1)$ DC intra prediction process also could not be invoked when reference line index is non-zero.

Figure 12:
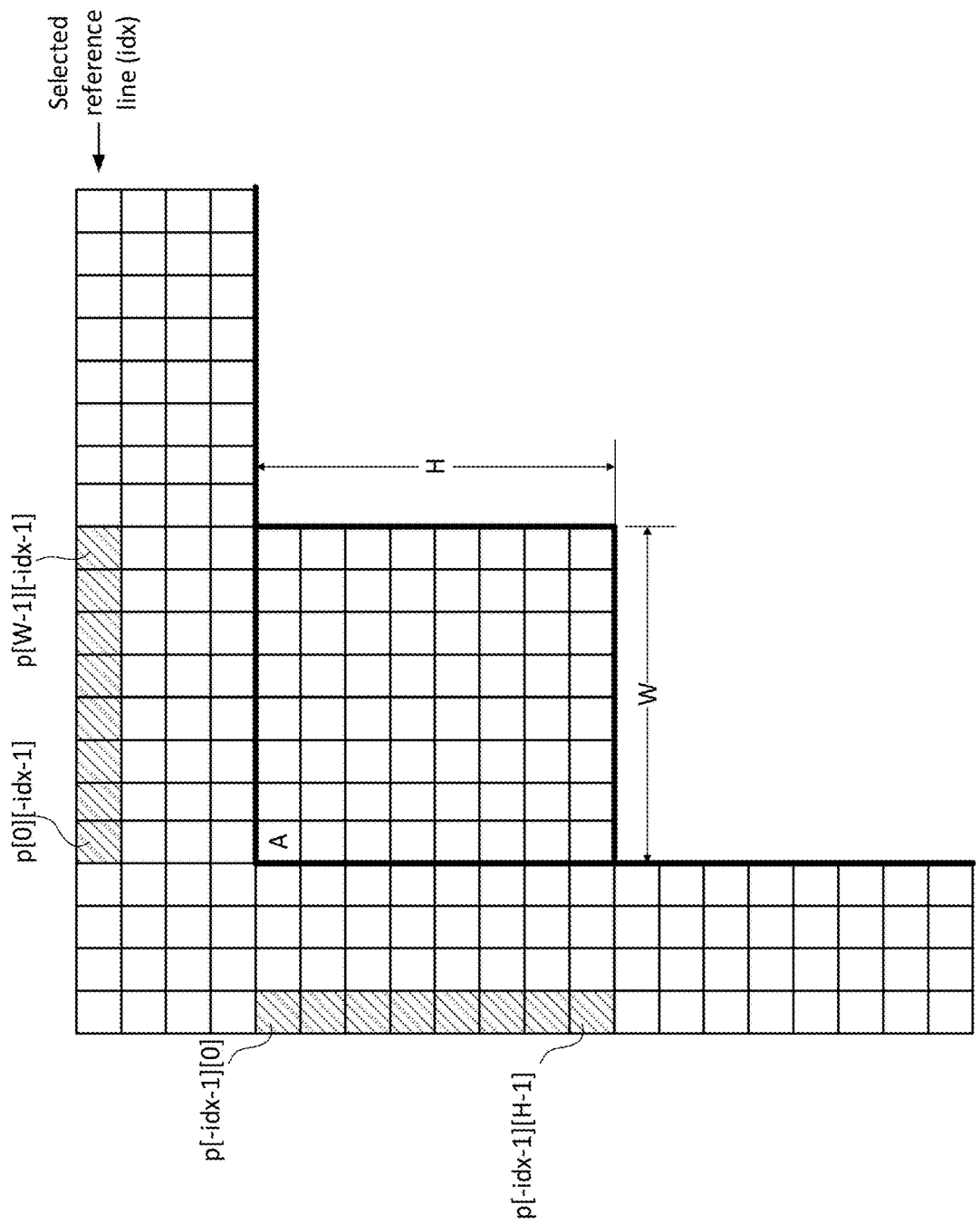
FIG. 12-FIG. 13 illustrate different reference sample selection methods for DC intra prediction mode.
Figure 13:
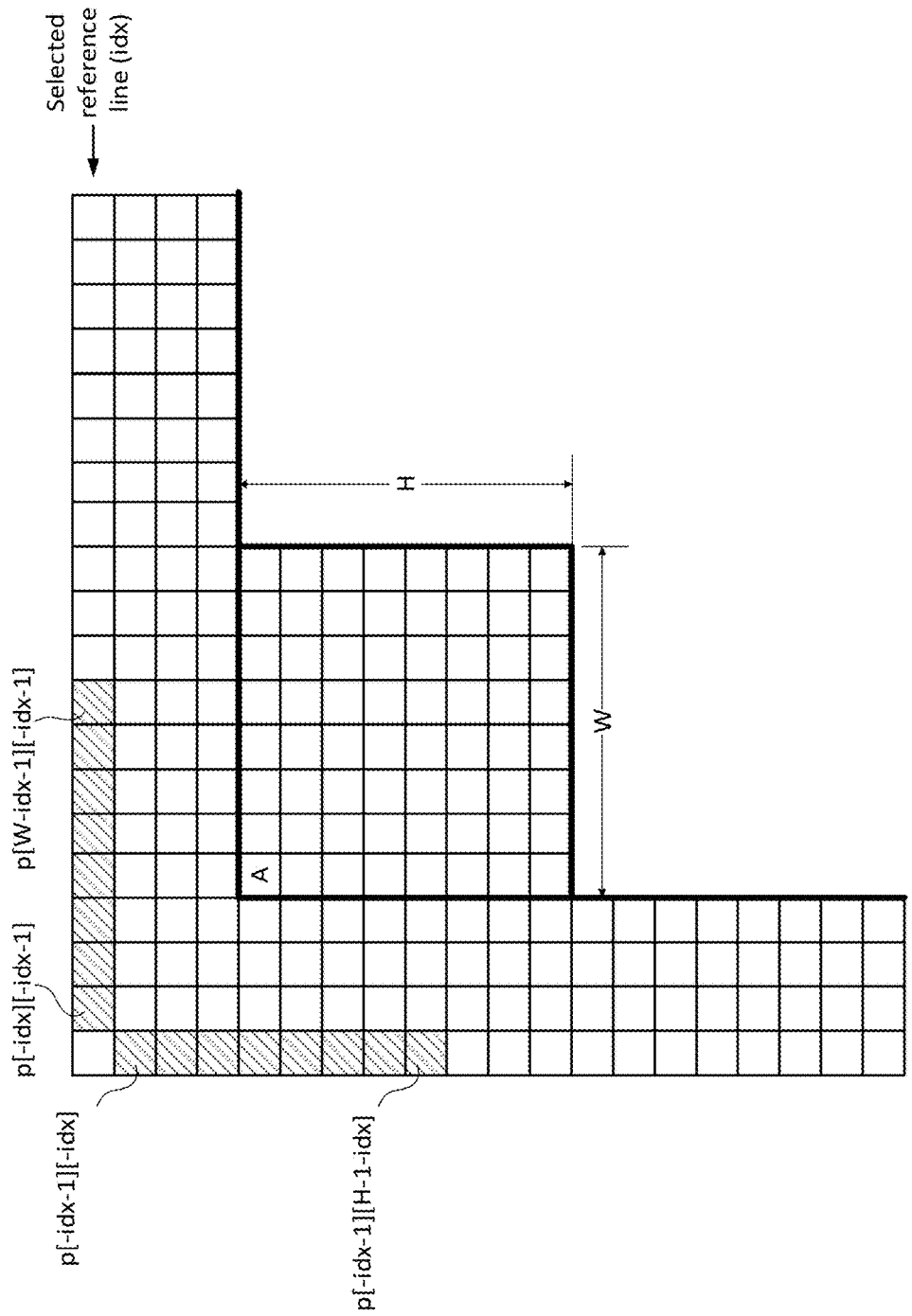

The embodiments shown in FIG. 12 and FIG. 13 disclose how to perform intra prediction using DC mode when reference line index is nonzero. Sampling mechanism in this case is similar to the ones disclosed above for PLANAR intra prediction mode:

Inputs to this process are:
a variable nTbW specifying the transform block width,
a variable nTbH specifying the transform block height,
a variable refIdx specifying the intra prediction reference line index,
the neighbouring samples p[x][y], with x=−1−refIdx, y=−1−refIdx . . . nTbH−refIdx−1 and x=−refIdx . . . nTbW−refIdx−1, y=−1−refIdx.

Outputs of this process are the predicted samples predSamples[x][y], with x=0 . . . nTbW−1, y=0 . . . nTbH−1.

The values of the prediction samples predSamples[x][y], with x=0 . . . nTbW−1, y=0 . . . nTbH−1, are derived by the following ordered steps:

A variable dcVal is derived as follows:

When nTbW is equal to nTbH:

$$dcVal=(\Sigma_{x'=0}^{nTbW-1}p[x'-refIdx][-1-refIdx]+\Sigma_{y'=0}^{nTbH-1}p[-1-refIdx][y'-refIdx]+ntbW)>>(\text{Log } 2(nTbW)+1)$$

When nTbW is greater than nTbH:

$$dcVal=(\Sigma_{x'=0}^{nTbW-1}p[x'-refIdx][-1-refIdx]+(nTbW>>1))>>\text{Log } 2(nTbW)$$

When nTbW is less than nTbH:

$$dcVal=(\Sigma_{y'=0}^{nTbH-1}p[-1-refIdx][y'-refIdx]+(nTbH>>1))>>\text{Log } 2(nTbH)$$

The prediction samples predSamples[x][y] are derived as follows:

$$predSamples[x][y]=dcVal, \text{ with } x=0 \ldots nTbW-1, y=0 \ldots nTbH-1$$

Another invention embodiment disables intra reference samples smoothing when reference samples are not adjacent to the block being predicted, i.e. when the index of the referenced line of reference samples (signaled by "infra_juma_ref_idx") is not equal to zero. Another embodiment consists in varying reference sample filter for PLANAR intra prediction mode with respect to the index of the referenced line of reference samples.

Exemplary filter selection is given in tables 4 and 5.

TABLE 4

Exemplary filter selection with respect to the index of the referenced line of reference samples

| Distance to the predicted block (samples) | Reference sampe filter selection |
| --- | --- |
| 0 | [ 1 2 1] if predicted block contain not less than 256 samples, [1] otherwise |
| Other values | [1] |

TABLE 5

Exemplary filter selection with respect to the index of the referenced line of reference samples

| Distance to the predicted block (samples) | Reference sampe filter selection |
| --- | --- |
| 0 | [ 1 2 1] if predicted block contain not less than 256 samples, [1] otherwise |
| 1 | [ 1 2 1] if predicted block contain not less than 128 samples, [1] otherwise |
| 2 | [ 1 0 2 0 1] if predicted block contain not less than 256 samples, [1] otherwise |
| 3 | [ 1 0 2 0 1] if predicted block contain not less than 128 samples, [1 2 1] otherwise |

Another embodiment of the invention enables PLANAR and DC intra prediction modes to be used for intra prediction of sub-partitions when intra sub partition (ISP) flag is set to 1. It is proposed not to perform PDPC operation when ISP flag is set to 1.

For the case when ISP mode is on, an exemplary embodiment of how to process DC intra is as follows:
calculate DC value for the reference sample of the whole block, and
use the predicted DC value as intra predictor for all the subblocks that belong to the block being predicted.

Method and apparatus for unified reference sample and interpolation filter selection in intra prediction with intra-subpartition and multi-reference line intra-prediction are provided. Combination of several intra prediction mechanisms in a single intra prediction module (254, 354 in FIG. 2 and FIG. 3) require unification of their processing steps. Specifically, the following aspects are desired to be identical or to have a minimum number of checks:
signaling of the intra prediction mode index;
preparation of a set of reference samples from the reconstructed neighboring samples;
reference sample filtering;
subpixel interpolation filtering.

Derivation of the intra prediction mode based on the intra prediction mode index is not as crucial as intra prediction mode signaling, but nevertheless important aspect since it is a part of an intra prediction pipeline that may introduce additional delay, especially when block size is small. The reason of this delay is in that intra prediction may start only after intra prediction mode is derived, and the process of intra prediction is faster for the blocks of smaller sizes.

The embodiments of this invention are aimed at unification of the decision-making steps of intra smoothing for different intra prediction mechanisms, comprising:
intra subpartitioning (ISP);
mode-dependent intra smoothing (MDIS);
wide-angular intra prediction (WAIP);
multi-reference line prediction (MRLP);
position-dependent intra prediction combination (PDPC).

The embodiments of this invention are the decision-making process that performs selection of reference and interpolation filters on the basis of checking the set of conditions that comprise:
block aspect ratio;
main reference side length;
intra prediction mode;
intra sub-partitioning.

The steps of the embodiments are as follows:
perform a fast check based on the flags parsed from the bitstream whether intra smoothing is required, wherein block filtering states are being detected, the states comprising
no-smoothing;
smoothing;
direction-dependent smoothing (size-dependent smoothing may be considered as a kind of direction-dependent smoothing);
When the state is detected as direction-dependent use intra-pre diction mode and the number of samples within the predicted block to determine the intra smoothing methods applied, including one or a combination of the following methods:
adjustment of the reference sample filtering strength;
adjustment of the interpolation filtering strength, for example, fG or fC,
presence of PDPC stage
When the no-smoothing state is detected, define a combination of intra smoothing methods to comprise none of them;
When the smoothing state is detected, specify a default combination of intra smoothing methods based on the number of samples within the predicted block;
Perform intra prediction comprising the selected combination of intra smoothing methods.

A part of VVC specification draft that performs the state derivation in accordance with the above listed steps could be as follows:
Inputs to this process are:
the intra prediction mode predModeIntra,
a variable nTbW specifying the transform block width,
a variable nTbH specifying the transform block height,
a variable nCbW specifying the coding block width,
a variable nCbH specifying the coding block height,
a color component index cIdx
Outputs of this process are the modified intra prediction mode predModeIntra, intraPredAngle parameter RefFilterFlag and InterpolationFlag variables.
The variables nW and nH are derived as follows:
If IntraSubPartitionsSplitType is equal to ISP_NO_SPLIT or cIdx is not equal to 0, the following applies:

$nW=nTbW$ (8-125)

$nH=nTbH$ (8-126)

Otherwise (IntraSubPartitionsSplitType is not equal to ISP_NO_SPLIT and cIdx is equal to 0), the following applies:

$nW=nCbW$ $nH=nCbH$

The variable whRatio is set equal to Abs(Log 2(nW/nH)).
For non-square blocks (nW is not equal to nH), the intra prediction mode predModeIntra is modified as follows:
If all of the following conditions are true, predModeIntra is set equal to (predModeIntra+65).
nW is greater than nH
predModeIntra is greater than or equal to 2
predModeIntra is less than (whRatio>1) ? (8+2*whRatio):8
Otherwise, if all of the following conditions are true, predModeIntra is set equal to (predModeIntra−67).
nH is greater than nW
predModeIntra is less than or equal to 66
predModeIntra is greater than (whRatio>1) ? (60−2*whRatio):60
The angle parameter intraPredAngle is determined as specified in Table 8-5 using predModeIntra value.

TABLE 8-5

Specification of intraPredAngle

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

The variable filterFlag is derived as follows:
The variable nTbS is set equal to log 2(nW)+log 2(nH)
If one or more of the following conditions is true, filterFlag is set equal to 0.
cIdx is not equal to 0
refIdx is not equal to 0
IntraSubPartitionsSplitType is not equal to ISP_NO_SPLIT and cIdx is equal to 0 and predModeIntra is greater than or equal to INTRA_ANGULAR34 and nW is greater than 8
IntraSubPartitionsSplitType is not equal to ISP_NO_SPLIT and cIdx is equal to 0 and predModeIntra is less than INTRA_ANGULAR34 and nH is greater than 8.
Otherwise, if predModeIntra is INTRA_PLANAR the variable filterFlag is set equal to nTbS>5?1:0
Otherwise, if intraPredAngle is greater than 32, variable filterFlag is set equal to 1
Otherwise, the following applies:
The variable minDistVerHor is set equal to Min(Abs(predModeIntra−50), Abs(predModeIntra−18)).
The variable intraHorVerDistThres[nTbS] is specified in Table 8-4.
The variable filterFlag is derived as follows:
If minDistVerHor is greater than intraHorVerDistThres[nTbS] or Abs (intraPredAngle)>32, filterFlag is set equal to 1.

TABLE 8-4

| Specification of intraHorVerDistThres[nTbS] for various transform block sizes nTbS | | | | | | |
|---|---|---|---|---|---|---|
| | nTbS = 2 | nTbS = 3 | nTbS = 4 | nTbS = 5 | nTbS = 6 | nTbS = 7 |
| intraHorVerDistThres[nTbS] | 16 | 14 | 2 | 0 | 0 | 0 |

The output variables RefFilterFlag and InterpolationFlag are derived as follows:
If predModeIntra is INTRA_PLANAR or predIntraAng is an integer multiple of 32, the variable RefFilterFlag is set equal to filterFlag, InterpolationFlag is set equal to 0,
Otherwise, the variable RefFilterFlag is set equal to 0, InterpolationFlag is set equal to filterFlag.

In the description above, two flags: RefFilterFlag and InterpolationFlag are derived. When RefFilterFlag is 1, reference samples are filtered prior to being used in intra prediction. For example, a filter with coefficients [1 2 1]/4 could be applied.

InterpolationFlag controls the selection of interpolation filter. When InterpolationFlag is 1, fG coefficients are used, otherwise, fC coefficients are used (see Table 8-6) in the subsample interpolation step of directional intra prediction process.

An alternative embodiment may be formulated as follows:
Inputs to this process are:
the intra prediction mode predModeIntra,
a variable nTbW specifying the transform block width,
a variable nTbH specifying the transform block height,
a variable nCbW specifying the coding block width,
a variable nCbH specifying the coding block height,
a color component index cIdx Outputs of this process are the modified intra prediction mode predModeIntra, intraPredAngle parameter RefFilterFlag and InterpolationFlag variables.

The variables nW and nH are derived as follows:
If IntraSubPartitionsSplitType is equal to ISP_NO_SPLIT or cIdx is not equal to 0, the following applies:

$nW=nTbW$ $nH=nTbH$

Otherwise (IntraSubPartitionsSplitType is not equal to ISP_NO_SPLIT and cIdx is equal to 0), the following applies:

$nW=nCbW$ $nH=nCbH$

TABLE 8-6

| | Specification of interpolation filter coefficients fC and fG | | | | | | | |
|---|---|---|---|---|---|---|---|---|
| Fractional sample | fC interpolation filter coefficients | | | | fG interpolation filter coefficients | | | |
| position p | fc[p][0] | fc[p][1] | fc[p][2] | fc[p][3] | fG[p][0] | fG[p][1] | fG[p][2] | fG[p][3] |
| 0 | 0 | 64 | 0 | 0 | 16 | 32 | 16 | 0 |
| 1 | −1 | 63 | 2 | 0 | 15 | 29 | 17 | 3 |
| 2 | −2 | 62 | 4 | 0 | 15 | 29 | 17 | 3 |
| 3 | −2 | 60 | 7 | −1 | 14 | 29 | 18 | 3 |
| 4 | −2 | 58 | 10 | −2 | 13 | 29 | 18 | 4 |
| 5 | −3 | 57 | 12 | −2 | 13 | 28 | 19 | 4 |
| 6 | −4 | 56 | 14 | −2 | 13 | 28 | 19 | 4 |
| 7 | −4 | 55 | 15 | −2 | 12 | 28 | 20 | 4 |
| 8 | −4 | 54 | 16 | −2 | 11 | 28 | 20 | 5 |
| 9 | −5 | 53 | 18 | −2 | 11 | 27 | 21 | 5 |
| 10 | −6 | 52 | 20 | −2 | 10 | 27 | 22 | 5 |
| 11 | −6 | 49 | 24 | −3 | 9 | 27 | 22 | 6 |
| 12 | −6 | 46 | 28 | −4 | 9 | 26 | 23 | 6 |
| 13 | −5 | 44 | 29 | −4 | 9 | 26 | 23 | 6 |
| 14 | −4 | 42 | 30 | −4 | 8 | 25 | 24 | 7 |
| 15 | −4 | 39 | 33 | −4 | 8 | 25 | 24 | 7 |
| 16 | −4 | 36 | 36 | −4 | 8 | 24 | 24 | 8 |
| 17 | −4 | 33 | 39 | −4 | 7 | 24 | 25 | 8 |
| 18 | −4 | 30 | 42 | −4 | 7 | 24 | 25 | 8 |
| 19 | −4 | 29 | 44 | −5 | 6 | 23 | 26 | 9 |
| 20 | −4 | 28 | 46 | −6 | 6 | 23 | 26 | 9 |
| 21 | −3 | 24 | 49 | −6 | 6 | 22 | 27 | 9 |
| 22 | −2 | 20 | 52 | −6 | 5 | 22 | 27 | 10 |
| 23 | −2 | 18 | 53 | −5 | 5 | 21 | 27 | 11 |
| 24 | −2 | 16 | 54 | −4 | 5 | 20 | 28 | 11 |
| 25 | −2 | 15 | 55 | −4 | 4 | 20 | 28 | 12 |
| 26 | −2 | 14 | 56 | −4 | 4 | 19 | 28 | 13 |
| 27 | −2 | 12 | 57 | −3 | 4 | 19 | 28 | 13 |
| 28 | −2 | 10 | 58 | −2 | 4 | 18 | 29 | 13 |
| 29 | −1 | 7 | 60 | −2 | 3 | 18 | 29 | 14 |
| 30 | 0 | 4 | 62 | −2 | 3 | 17 | 29 | 15 |
| 31 | 0 | 2 | 63 | −1 | 3 | 17 | 29 | 15 |

The variable whRatio is set equal to Abs(Log 2(nW/nH)).

For non-square blocks (nW is not equal to nH), the intra prediction mode predModeIntra is modified as follows:

predModeIntraOrig is set equal to predModeIntra

If all of the following conditions are true, predModeIntra is set equal to (predModeIntra+65).
  nW is greater than nH
  predModeIntra is greater than or equal to 2
  predModeIntra is less than (whRatio>1) ? (8+2*whRatio):8

Otherwise, if all of the following conditions are true, predModeIntra is set equal to (predModeIntra−67).
  nH is greater than nW
  predModeIntra is less than or equal to 66
  predModeIntra is greater than (whRatio>1) ? (60−2*whRatio):60

The angle parameter intraPredAngle is determined as specified in Table 8-5 using predModeIntra value.

The variable nTbS is set equal to log 2(nW)+log 2(nH)

The variable smoothState is set to 0 (FILTER_NONE) when one of the following conditions is true:

The output variables RefFilterFlag and InterpolationFlag are derived as follows:

If predModeIntra is INTRA_PLANAR or predIntraAng is an integer multiple of 32, the variable RefFilterFlag is set equal to filterFlag, InterpolationFlag is set equal to 0, Otherwise, the variable RefFilterFlag is set equal to 0, InterpolationFlag is set equal to filterFlag.

Further optimization of MDIS decision making is possible as the following modification of smoothState is set to 2 (FILTER_MDIS) part:

...

If smoothState is less than 2, filterFlag is set equal to smoothState,

Otherwise, filterFlag is set equal to 1 when one of the following conditions is true:
  predModeIntraOrig is INTRA_PLANAR and nTbS is greater than 5;
  predModeIntraOrig is greater than 1 and predModeIntraOrig is smaller than 67 and Abs(IntraPredAngle) is not less than IntraPredAngleThr [nTbS]

|  | nTbS = 2 | nTbS = 3 | nTbS = 4 | nTbS = 5 | nTbS = 6 | nTbS = 7 |
|---|---|---|---|---|---|---|
| IntraPredAngleThr[nTbS] | 32 | 26 | 2 | 0 | 0 | 0 |

The variable nTbS is not greater than 2
cIdx is not equal to 0
refIdx is not equal to 0
predModeIntraOrig is INTRA_DC
ISP flag is on The variable smoothState is set to 1(FILTER_ALWAYS) when intraPredAngle is greater than 32

Otherwise, smoothState is set to 2 (FILTER_MDIS)

If smoothState is less than 2, filterFlag is set equal to smoothState,

Otherwise, filterFlag is set equal to 1 when one of the following conditions is true:
  predModeIntraOrig is INTRA_PLANAR and nTbS is greater than 5;
  predModeIntraOrig is greater than 1 and predModeIntraOrig is smaller than 67 and Min(Abs(predModeIntra−50), Abs(predModeIntra−18)) is greater than intraHorVerDistThres[nTbS]

The output variables RefFilterFlag and InterpolationFlag are derived as follows:

If predModeIntra is INTRA_PLANAR or predIntraAng is an integer multiple of 32, the variable RefFilterFlag is set equal to filterFlag, InterpolationFlag is set equal to 0, Otherwise, the variable RefFilterFlag is set equal to 0, InterpolationFlag is set equal to filterFlag.

...

Based on the embodiments described above, a set of conditions for no-smoothing state may comprise one or several from the following:
  ISP flag is on
  refIdx is greater than 1
  length of the main reference side is smaller than the main side reference threshold.

The main side reference threshold could be a pre-defined constant value that is equal to either 4, 8 or 16.

Besides, when ISP flag is on, a different thresholding may be applied to determine filterFlag value. Table 6 and 7 exemplifies this dependency for the variant of thresholding by predIntraAng parameter value and by intraPredMode value.

TABLE 6

Dependency of the intraPredAngle on ISP flag value

|  | nTbS = 2 | nTbS = 3 | nTbS = 4 | nTbS = 5 | nTbS = 6 | nTbS = 7 |
|---|---|---|---|---|---|---|
| IntraPredAngleThr[nTbS], ISP flag is 0 | 32 | 26 | 2 | 0 | 0 | 0 |
| IntraPredAngleThr[nTbS], ISP flag is 1 | 32 | 32 | 24 | 8 | 2 | 0 |

TABLE 7

Dependency of the intraHorVerDistThres on ISP flag value

|  | nTbS = 2 | nTbS = 3 | nTbS = 4 | nTbS = 5 | nTbS = 6 | nTbS = 7 |
|---|---|---|---|---|---|---|
| intraHorVerDistThres[nTbS], ISP flag is 0 | 16 | 14 | 2 | 0 | 0 | 0 |
| intraHorVerDistThres[nTbS], ISP flag is 1 | 16 | 16 | 14 | 8 | 2 | 0 |

Figure 14:
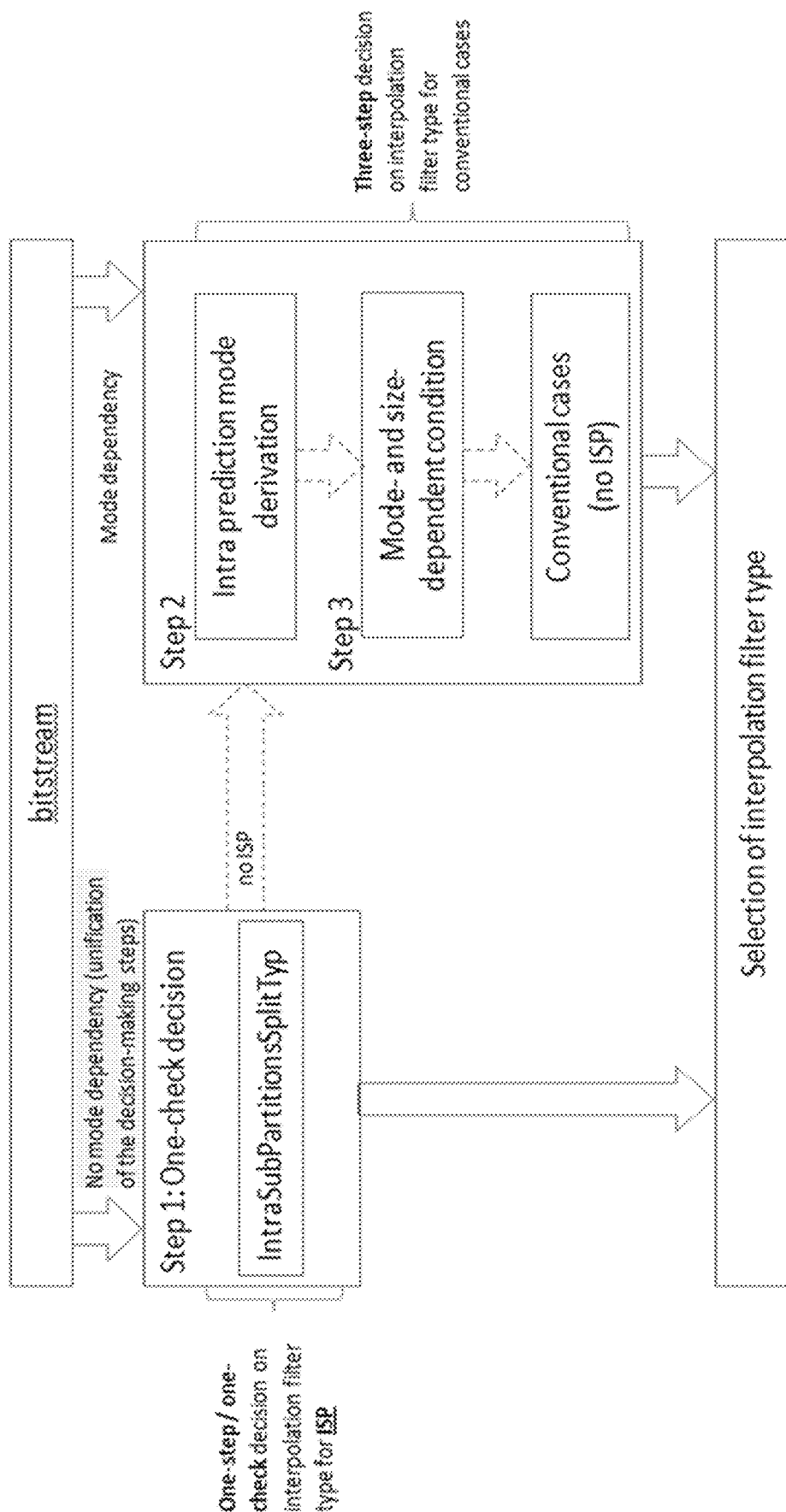
FIG. 14 is a block diagram illustrating an example of selection of interpolation filter type.

FIG. 14 is a block diagram illustrating an example of selection of interpolation filter type. As shown at step 1 of FIG. 14, if ISP is on (i.e., IntraSubPartitionsSplitType!=ISP_NO_SPLIT), one-step/one-check decision on interpolation filter type for ISP can be performed. There is no mode dependency when ISP is on. When ISP is on, the value of the filterFlag is 0, and interpolation filter type fC will be selected. This could lead to unification of the decision-making steps.

If ISP is off (i.e., no ISP), the conventional case will be performed as shown at step 2 and step 3. The conventional case is mode dependency. At step 2, intra prediction mode is derived. At step 3, mode- and size-dependent condition for interpolation filter type is derived. Therefore, there is at least three step decision on interpolation filter type for conventional cases. After step 3, interpolation filter type is selected based on the mode- and size-dependent condition derived at step 3.

Figure 15:
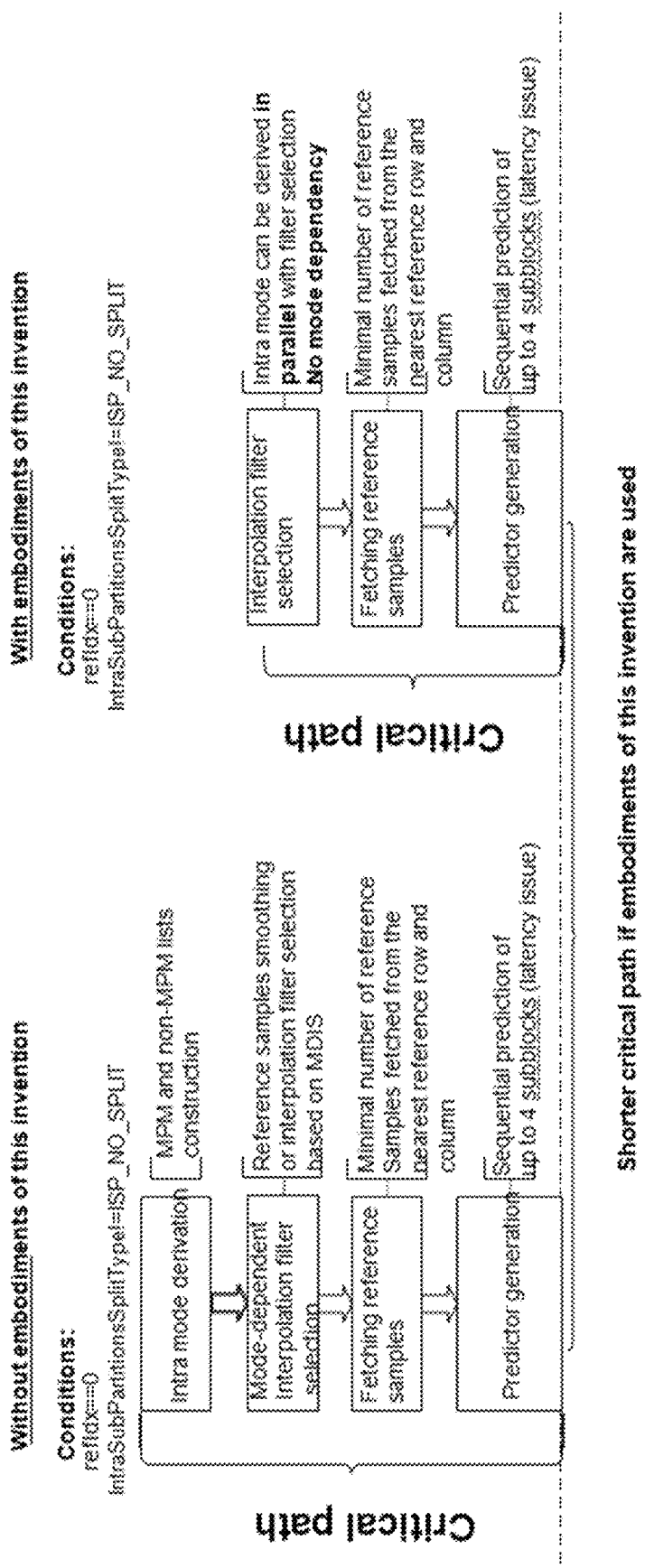
FIG. 15 is a block diagram illustrating another example of selection of interpolation filter type.

FIG. 15 is a block diagram illustrating another example of selection of interpolation filter type comparing with the conventional cases. In conventional cases, intra mode is derived when MRL is off (i.e., refIdx==0), and ISP is on (i.e., IntraSubPartitionsSplitType!=ISP_NO_SPLIT). For example, most probable modes (MPM) and non-MPM lists are constructed during intra mode derivation.

Then, mode-dependent interpolation filter type is selected. Reference samples smoothing or interpolation filter selection based on MDIS is performed during the mode-dependent interpolation filter selection. Minimal number of reference samples are fetched from the nearest reference row and column. Intra predictor is generated after fetching reference samples. For example, sequential prediction of up to 4 subblocks may be performed during the predictor generation.

Comparing with the conventional cases, the embodiments of this invention remove the mode dependency when selecting the interpolation filter type when MRL is off (i.e., refIdx==0), and ISP is on (i.e., IntraSubPartitionsSplitType!=ISP_NO_SPLIT). Intra mode can be derived in parallel with filter selection. Therefore, shorter critical path if embodiments of this invention are used when generating the intra prediction.

Usually, prediction generation for ISP is more complex as it requires iterative decoding process. The embodiments of the invention may increase the decoding efficiency.

In particular, the following methods and embodiments of prediction coding of a current block implemented by a decoding or encoding device. The decoding device may be video decoder 30 of FIG. 1A, or decoder 30 of FIG. 3. The encoding device may be video encoder 20 of FIG. 1A, or encoder 20 of FIG. 2.

Figure 16:
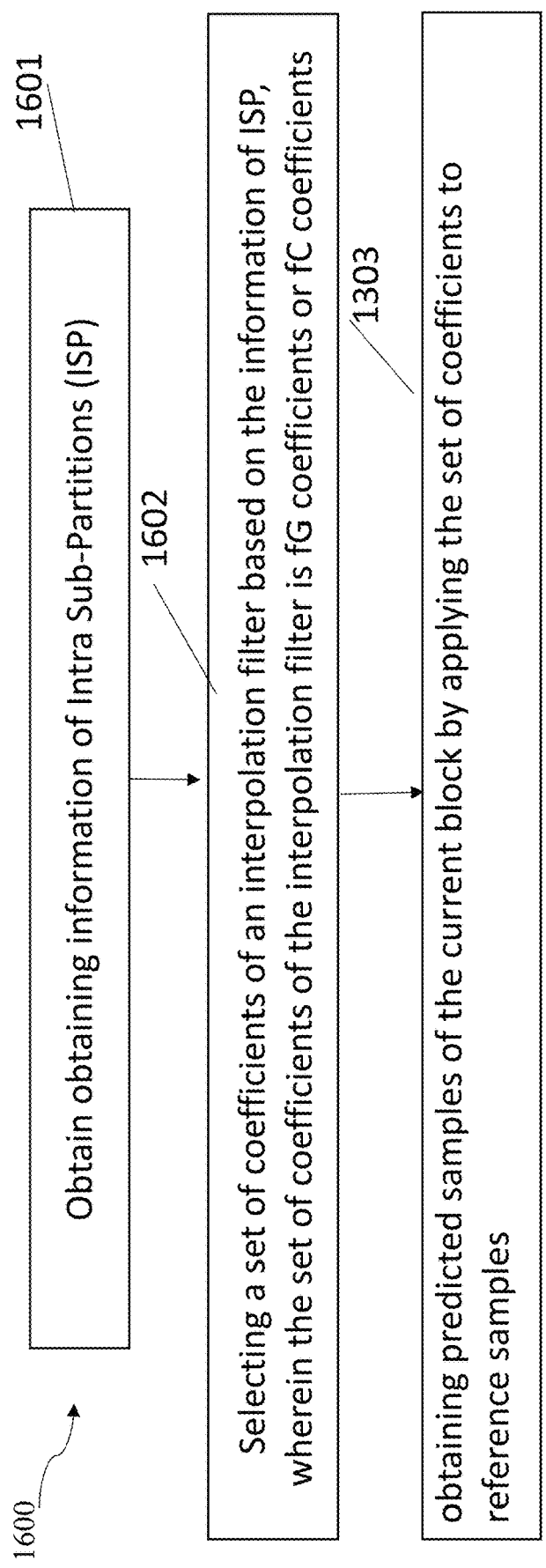
FIG. 16 illustrates embodiments of method 1600 according to the present invention.

According to an embodiment 1600 (see FIG. 16), the device obtains information of Intra Sub-Partitions (ISP) at step 1601, where the information of ISP indicates whether ISP is used for splitting a current block. The information of ISP may be indicated by IntraSubPartitionsSplitType. ISP is used (i.e., ISP is on) for splitting the current block when IntraSubPartitionsSplitType!=ISP_NO_SPLIT.

At step 1602, the device selects a set of coefficients of an interpolation filter based on the information of ISP, wherein the set of coefficients of the interpolation filter are fG coefficients or fC coefficients. The value of a filter flag (filterFlag) may be used to indicate the set of coefficients of the interpolation filter is fG coefficients or fC coefficients. When the value of filterFlag is 0, fC coefficients are selected. Otherwise, fG coefficients are selected.

When the information of ISP indicates ISP is used for splitting the current block, a block filtering state is no-smoothing state. The block filtering state may be indicated by a flag smoothState, and the block filtering state is no-smoothing state when the value of smoothState is 0. The value of filterFlag is equal to the value of smoothState. That means the value of filterFlag is 0 when the block filtering state is no-smoothing state. Correspondingly, fC coefficients will be selected.

At step 1603, the device obtains predicted samples of the current block by applying the set of coefficients to reference samples. The device may determine interpolation filter coefficients from the set of coefficients of the interpolation filter based on an intra prediction mode of the current block; and then obtain predicted samples of the current block by applying the determined interpolation filter coefficients to reference samples.

Figure 17:
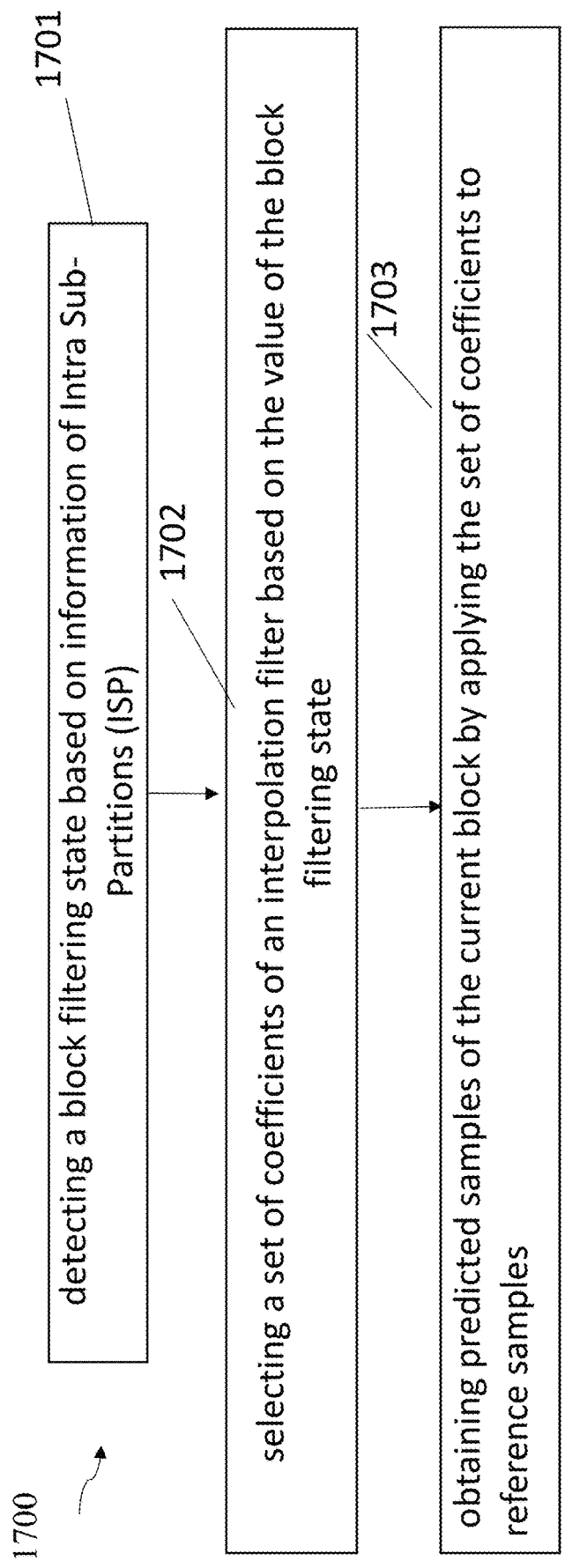
FIG. 17 illustrates embodiments of method 1700 according to the present invention.

According to an embodiment 1700 (see FIG. 17), the device detects a block filtering state based on information of ISP at step 1701, where the block filtering state includes no-smoothing state, smoothing state, or direction-dependent smoothing state. The information of ISP may be indicated by IntraSubPartitionsSplitType. ISP is used (i.e., ISP is on) for splitting the current block when IntraSubPartitionsSplitType!=ISP_NO_SPLIT. When the information of ISP indicates ISP is used for splitting the current block, a block filtering state is no-smoothing state. The block filtering state may be indicated by a flag smoothState, and the block filtering state is no-smoothing state when the value of smoothState is 0.

At step 1702, the device selects a set of coefficients of an interpolation filter based on the value of the block filtering state, where the set of coefficients of the interpolation filter is fG coefficients or fC coefficients. The value of a filter flag (filterFlag) may be used to indicate the set of coefficients of the interpolation filter are fG coefficients or fC coefficients. When the value of filterFlag is 0, fC coefficients are selected. Otherwise, fG coefficients are selected.

The value of filterFlag is equal to the value of smoothState. That means the value of filterFlag is 0 when the block filtering state is no-smoothing state. Correspondingly, fC coefficients will be selected.

At step 1703, the device obtains predicted samples of the current block by applying the set of coefficients to reference samples. The device may determine interpolation filter coefficients from the set of coefficients of the interpolation filter based on an intra prediction mode of the current block; and then obtain predicted samples of the current block by applying the determined interpolation filter coefficients to reference samples.

Detailed information of embodiments 1600 or 1700 are shown in the above-mentioned embodiments.

Figure 18:
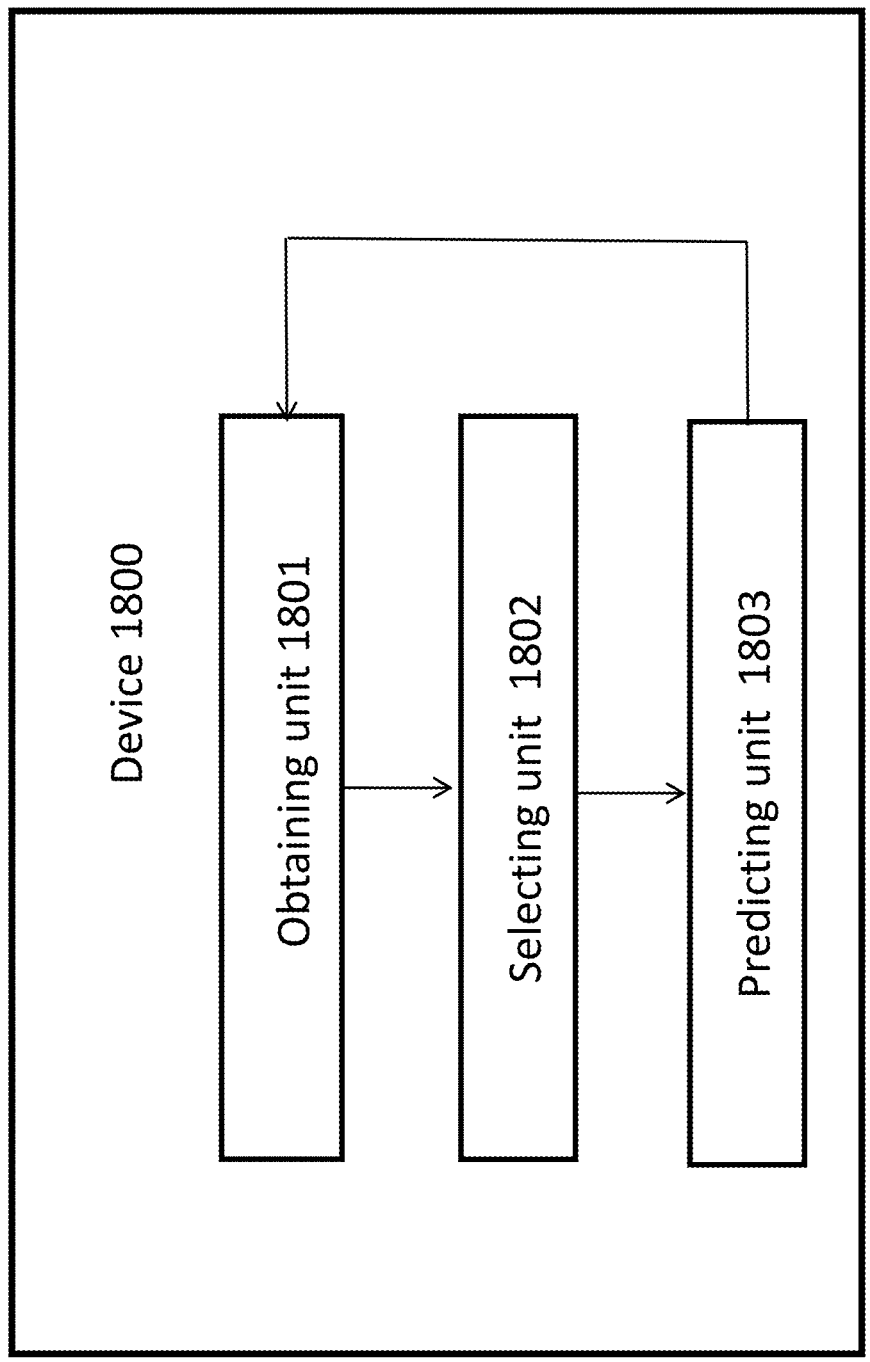
FIG. 18 illustrates embodiments of a device 1800 for use according to the present invention.

FIG. 18 illustrates embodiments of a device 1800. The device 1800 may be video decoder 30 of FIG. 1A, or decoder 30 of FIG. 3, or may be video encoder 20 of FIG. 1A, or encoder 20 of FIG. 2. The device 1800 can be used to implement the embodiment 1600, and the other embodiments described above.

The device 1800 of intra prediction of a picture, includes an obtaining unit 1801, a selecting unit 1802, and a predicting unit 1803. The obtaining unit 1801, configured to obtain information of Intra Sub-Partitions (ISP), wherein the information of ISP indicates whether ISP is used for splitting a current block. The selecting unit 1802, configured to select a set of coefficients of an interpolation filter based on the information of ISP, wherein the set of coefficients of the interpolation filter is fG coefficients or fC coefficients. The predicting unit 1803, configured to obtain predicted samples of the current block by applying the set of coefficients to reference samples.

The selecting unit 1802, configured to determine a block filtering state is no-smoothing state when the information of ISP indicates ISP is used for splitting the current block; and select fC coefficients when the block filtering state is no-smoothing state.

The predicting unit 1803, configured to determine interpolation filter coefficients from the set of coefficients of the interpolation filter based on an intra prediction mode of the current block; and obtain predicted samples of the current block by applying the determined interpolation filter coefficients to reference samples.

Figure 19:
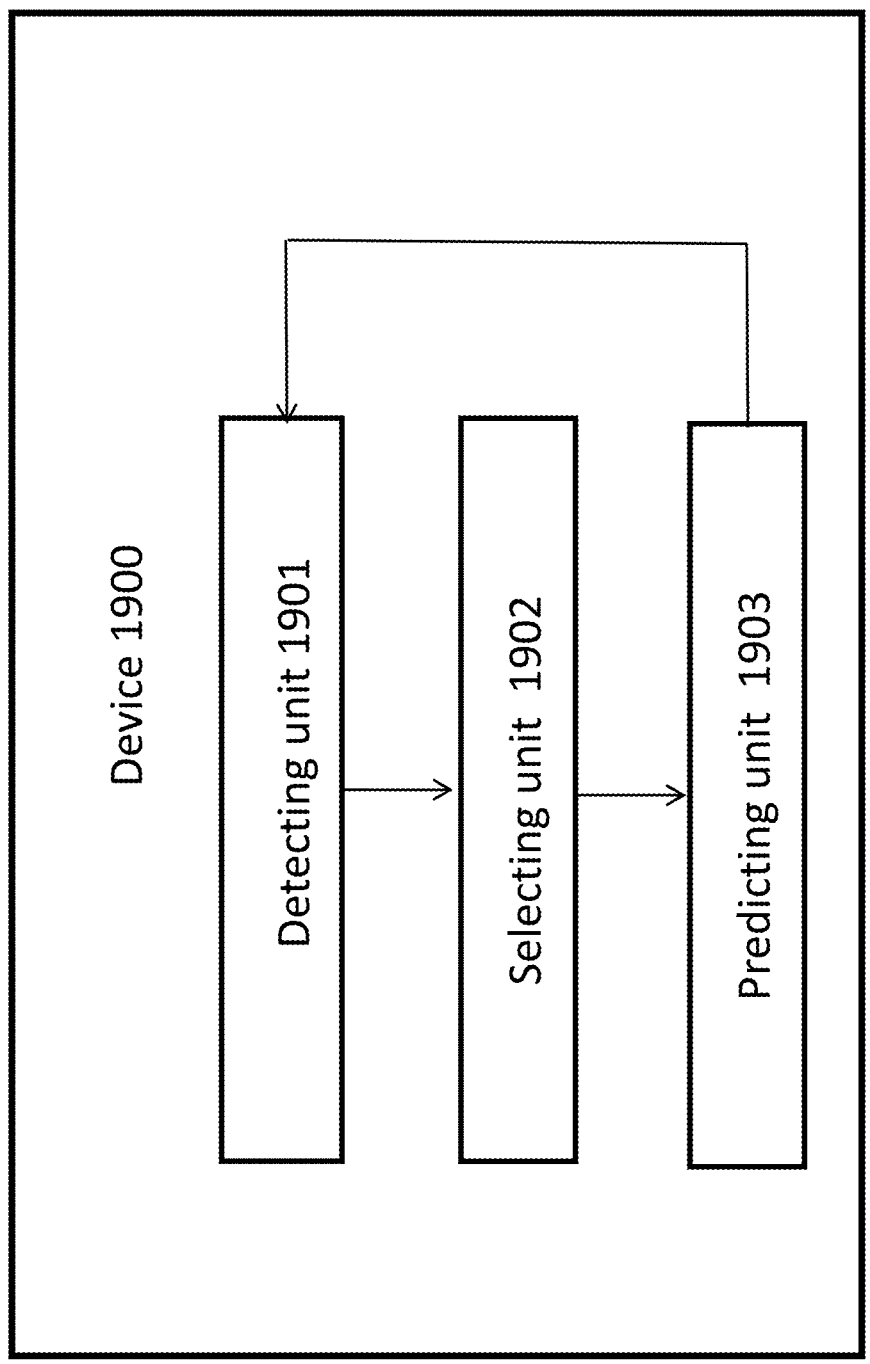
FIG. 19 illustrates embodiments of a device 1900 for use according to the present invention.

FIG. 19 illustrates embodiments of a device 1900. The device 1900 may be video decoder 30 of FIG. 1A, or decoder 30 of FIG. 3, or may be video encoder 20 of FIG. 1A, or encoder 20 of FIG. 2. The device 1900 can be used to implement the embodiment 1700, and the other embodiments described above.

The device 1900 of intra prediction of a picture, includes a detecting unit 1901, a selecting unit 1902, and a predicting unit 1903. The detecting unit 1901, configured to detect a block filtering state based on information of Intra Sub-Partitions (ISP), where the block filtering state includes no-smoothing state, smoothing state, or direction-dependent smoothing state. The selecting unit 1902, configured to select a set of coefficients of an interpolation filter based on the value of the block filtering state, where the set of coefficients of the interpolation filter is fG coefficients or fC coefficient. The predicting unit 1903, configured to obtain predicted samples of the current block by applying the set of coefficients to reference samples.

The selecting unit 1902, configured to determine a filter flag (filterFlag) based on the block filtering state, wherein the value of filterFlag indicates the set of coefficients of the interpolation filter are fG coefficients or fC coefficients; and select the set of coefficients of the interpolation filter based on the value of the filter flag.

The predicting unit 1903, configured to determine interpolation filter coefficients from the set of coefficients of the interpolation filter based on an intra prediction mode of the current block; and obtain predicted samples of the current block by applying the determined interpolation filter coefficients to reference samples.

The present disclosure provides the following set of embodiments or aspects:

Embodiment 1. A method of intra smoothing for an intra prediction of a block, comprising:
  determine a smoothing state of the block, where the smoothing state includes no-smoothing, smoothing, or direction-dependent smoothing;
  perform the following steps based on the smoothing state of the block:
    When the smoothing state is the direction-dependent smoothing, use direction slope and the number of samples within the predicted block to determine intra smoothing methods;
    When the smoothing state is the no-smoothing, using none of the intra smoothing methods; or
    When the smoothing state is smoothing, using a default combination of the intra smoothing methods based on the number of samples within the predicted block.

Embodiment 2. The method of embodiment 1, wherein the intra smoothing methods comprise one or more of the following:
  adjustment of the reference sample filtering strength;
  adjustment of the interpolation filtering strength; or
  presence of PDPC stage.

Embodiment 3. The method of embodiment 1 or 2, wherein the direction slope is defined from the prediction mode index as $$\mathrm{Min}(\mathrm{Abs}(\mathrm{predModeIntra}-50),\mathrm{Abs}(\mathrm{predModeIntra}-18)).$$

Embodiment 4. The method of embodiment 1 or 2, wherein the direction slope is defined from the parameter predIntraAng as Abs(predIntraAng).

Embodiment 5. The method of any of the previous embodiments, wherein the intra prediction comprising one or more of the following:
  intra subpartitioning (ISP);
  mode-dependent intra smoothing (MDIS);
  wide-angular intra prediction (WAIP);
  multi-reference line prediction (MRLP); or
  position-dependent intra prediction combination (PDPC).

Embodiment 6. The method of embodiment 5, wherein an ISP flag is considered when the smoothing state is the direction-dependent smoothing.

Embodiment 7. The method of embodiment 5 or 6, wherein no filtering state is set to non-filtering when intra prediction mode is INTRA_DC, or MRLP reference index is not equal to 0, or chroma component is processed.

Embodiment 8. The method of any of the previous embodiments, unification of the intra prediction based on one or more of the following:
  block aspect ratio;
  main reference side length;
  intra prediction mode; or
  intra sub-partitioning.

Embodiment 9. The method of any of the previous embodiments, wherein the method further comprises:
parsing one or more flags from a bitstream, and
determine whether to perform the intra smoothing based on the one or more flags.

As discussed above, when ISP is on, embodiments of the invention remove mode dependency during selection of interpolation filter type. When ISP is on, the value of the filterFlag is 0, and interpolation filter type fC will be selected. Embodiments of the invention provide a shorter path or pass path technical solution comparing with the mode dependency methods in the conventional cases. This could increase encoding or decoding efficiency, and also lead to unification of the decision-making steps.

Following is an explanation of the applications of the encoding method as well as the decoding method as shown in the above-mentioned embodiments, and a system using them.

Figure 20:
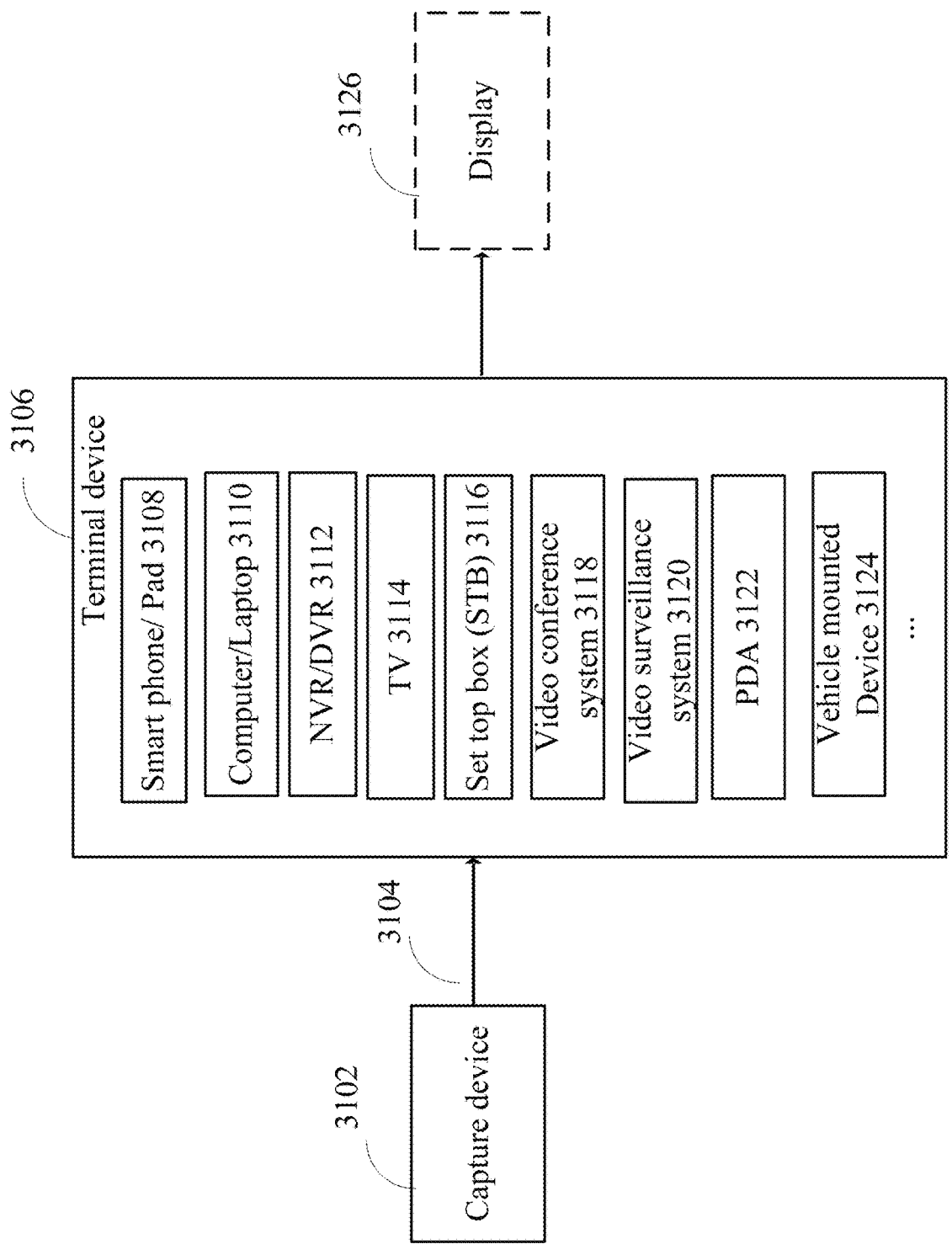
FIG. 20 is a block diagram showing an example structure of a content supply system 3100 which realizes a content delivery service.

FIG. 20 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 21:
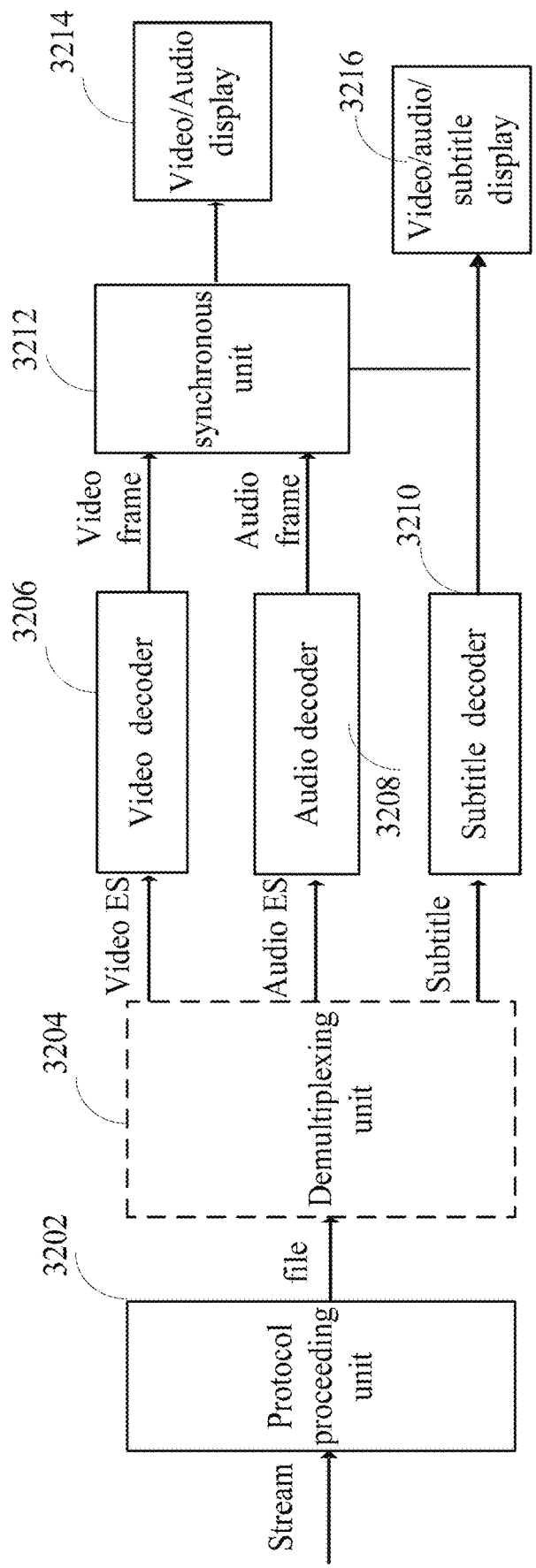
FIG. 21 is a block diagram showing a structure of an example of a terminal device.

FIG. 21 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present invention is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

x % y Modulus. Remainder of x divided by y, defined only for integers x and y with x>=0 and y>0.

Logical Operators

The following logical operators are defined as follows:

| | |
|---|---|
| x && y | Boolean logical "and" of x and y |
| x \|\| y | Boolean logical "or" of x and y |
| ! | Boolean logical "not" |
| x ? y : z | If x is TRUE or not equal to 0, evaluates to the value of y; otherwise, evaluates to the value of z. |

Relational Operators

The following relational operators are defined as follows:

\> Greater than
\>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
∧ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator
++ Increment, i.e., x++ is equivalent to x=x+1; when used in an array index, evaluates to the value of the variable prior to the increment operation.
−− Decrement, i.e., x−− is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).
−= Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π+2, inclusive, in units of radians $$\text{Atan2}(y, x) = \begin{cases} A\tan\left(\frac{y}{x}\right); & x > 0 \\ A\tan\left(\frac{y}{x}\right) + \pi; & x < 0 \;\&\&\; y >= 0 \\ A\tan\left(\frac{y}{x}\right) - \pi; & x < 0 \;\&\&\; y < 0 \\ +\frac{\pi}{2}; & x == 0 \;\&\&\; y >= 0 \\ -\frac{\pi}{2}; & \text{otherwise} \end{cases}$$

Ceil(x) the smallest integer greater than or equal to x.

$Clip1_Y(x) = Clip3(0, (1 << BitDepth_Y) - 1, x)$ $Clip1_C(x) = Clip3(0, (1 << BitDepth_C) - 1, x)$ $Clip3(x, y, z) = \begin{cases} x; & z < x \\ y; & z > y \\ z; & \text{otherwise} \end{cases}$ Cos(x) the trigonometric cosine function operating on an argument x in units of radians.

Floor(x) the largest integer less than or equal to x.

$GetCurrMsb(a, b, c, d) = \begin{cases} c + d; & b - a >= d/2 \\ c - d; & a - b > d/2 \\ c; & \text{otherwise} \end{cases}$ Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$Min(x, y) = \begin{cases} x; & x <= y \\ y; & x > y \end{cases}$ $Max(x, y) = \begin{cases} x; & x >= y \\ y; & x < y \end{cases}$ Round(x)=Sign(x)*Floor(Abs(x)+0.5)

$Sign(x) = \begin{cases} 1; & x > 0 \\ 0; & x == 0 \\ -1; & x < 0 \end{cases}$

Sin(x) the trigonometric sine function operating on an argument x in units of radians Sqrt(x)=$\sqrt{x}$ Swap(x, y)=(y, x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)

| |
|---|
| operations (with operands x, y, and z) "x++", "x−−" |
| "!x", "−x" (as a unary prefix operator) $x^y$ |
| "x * y", "x / y", "x ÷ y", "$\frac{x}{y}$", "x % y" |
| "x + y", "x − y" (as a two-argument operator), |
| "$\sum_{i=x}^{y} f(i)$" |
| "x << y", "x >> y" "x < y", "x <= y", "x > y", "x >= y" "x == y", "x != y" "x & y" "x \| y" "x && y" "x \|\| y" "x ? y : z" "x . . . y" "x = y", "x += y", "x −= y" |

Text Description of Logical Operations

In the text, a statement of logical operations as would be described mathematically in the following form:

| |
|---|
| if( condition 0 )<br>    statement 0<br>else if( condition 1 )<br>    statement 1<br>. . .<br>else /* informative remark on remaining condition */<br>    statement n | may be described in the following manner:

| |
|---|
| . . . as follows / . . . the following applies:<br>    If condition 0, statement 0<br>    Otherwise, if condition 1, statement 1<br>. . .<br>    Otherwise (informative remark on remaining condition), statement n |

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

| |
|---|
| if( condition 0a && condition 0b )<br>    statement 0<br>else if( condition 1a \|\| condition 1b )<br>    statement 1<br>. . .<br>else<br>    statement n | may be described in the following manner:

```
... as follows / ... the following applies:
       If all of the following conditions are true, statement 0:
           condition 0a
           condition 0b
       Otherwise, if one or more of the following conditions are
true,
       statement 1:
           condition 1a
           condition 1b
       ...
       Otherwise, statement n
```

In the text, a statement of logical operations as would be described mathematically in the following form:
if (condition 0)
  statement 0
if(condition 1)
  statement 1
may be described in the following manner:
  When condition 0, statement 0
  When condition 1, statement 1

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A method for video decoding or video encoding, in which one or more processing devices perform operations:
  obtaining information indicating an Intra Sub-Partitions (ISP) split type, wherein the information includes a flag "IntraSubPartitionSplitType";
  setting a value of a filter flag based on the ISP split type indicated by the information, wherein the value of the filter flag is set to 0 when IntraSubPartitionSplitType is not equal to ISP_NO_SPLIT;
  selecting coefficients for an interpolation filter according to the value of the filter flag, wherein fC coefficients are selected when the value of the filter flag is 0 and fG coefficients are selected when the value of the filter flag is not 0; and
  applying the selected coefficients to reference samples to obtain predicted samples of a current block.

2. The method of claim 1, wherein a filtering state for the current block is no-smoothing state when the value of the filter flag is set to 0.

3. The method of claim 1, wherein applying the selected coefficients to the reference samples to obtain the predicted samples of the current block comprises:
- determining interpolation filter coefficients from the selected coefficients of the interpolation filter based on an intra prediction mode of the current block; and
- applying the determined interpolation filter coefficients to the reference samples.

4. The method of claim 3, wherein the intra prediction mode is a directional intra prediction mode.

5. The method of claim 1, wherein the operations further comprise:
- obtaining a value of a flag that indicates whether an intra-prediction mechanism is applied; and
- comparing the value of the obtained flag with a predetermined binary value.

6. The method of claim 5, wherein the intra-prediction mechanisms and corresponding predetermined threshold values comprise at least one of the following:
- multi-reference line prediction (MRLP) (refIdx) with the predetermined threshold value set to 0; or
- intra subpartitioning (ISP) flag with the predetermined threshold value set to 0.

7. A device, wherein the device is an encoder or a decoder, comprising:
- one or more processors; and one or more non-transitory computer-readable medium communicatively coupled to the one or more processors, wherein the one or more processors are configured to execute program code stored in the non-transitory computer-readable medium and thereby perform operations comprising:
- obtaining information indicating an Intra Sub-Partitions (ISP) split type, wherein the information includes a flag "IntraSubPartitionsSplitType";
- setting a value of a filter flag based on the ISP split type indicated by the information, wherein the value of the filter flag is set to 0 when IntraSubPartitionsSplitType is not equal to ISPNO_SPLIT;
- selecting coefficients for an interpolation filter according to the value of the filter flag, wherein fC coefficients are selected when the value of the filter flag is 0 and fG coefficients are selected when the value of the filter flag is not 0, and
- applying the selected coefficients to reference samples to obtain predicted samples of a current block.

8. The device of claim 7, wherein a filtering state for the current block is no-smoothing state when the value of the filter flag is set to 0.

9. The device of claim 7, wherein applying the selected coefficients to the reference samples to obtain the predicted samples of the current block comprises:
- determining interpolation filter coefficients from the selected coefficients of the interpolation filter based on an intra prediction mode of the current block; and
- applying the determined interpolation filter coefficients to the reference samples.

10. The device of claim 9, wherein the intra prediction mode is a directional intra prediction mode.

11. The device of claim 7, wherein the operations further comprise:
- obtaining a value of a flag that indicates whether an intra-prediction mechanism is applied; and
- comparing the value of the obtained flag with a predetermined binary value.

12. The device of claim 11, wherein the intra-prediction mechanisms and corresponding predetermined threshold values comprise at least one of the following:
- multi-reference line prediction (MRLP) (refIdx) with the predetermined threshold value set to 0; or
- intra subpartitioning (ISP) flag with the predetermined threshold value set to 0.

13. A non-transitory computer-readable media storing computer instructions for intra prediction of a block of a picture, that when executed by one or more processors, cause the one or more processors to perform the operations of:
- obtaining information indicating an Intra Sub-Partitions (ISP) split type, wherein the information includes a flag "IntraSubPartitionsSplitType";
- setting a value of a filter flag based on the ISP split type indicated by the information, wherein the value of the filter flag is set to 0 when IntraSubPartitionsSplitType is not equal to ISPNO_SPLIT;
- selecting coefficients for an interpolation filter according to the value of the filter flag, wherein fC coefficients are selected when the value of the filter flag is and fG coefficients are selected when value of the filter flag is not 0; and
- applying the selected coefficients to reference samples to obtain predicted samples of a current block.

14. The non-transitory computer-readable media of claim 13, wherein a filtering state for the current block is no-smoothing state when the value of the filter flag is set to 0.

15. The non-transitory computer-readable media of claim 13, wherein applying the selected coefficients to the reference samples to obtain the predicted samples of the current block comprises:
- determining interpolation filter coefficients from the selected coefficients of the interpolation filter based on an intra prediction mode of the current block; and
- applying the determined interpolation filter coefficients to the reference samples.

16. The non-transitory computer-readable media of claim 15, wherein the intra prediction mode is a directional intra prediction mode.

17. The non-transitory computer-readable media of claim 15, wherein the operations further comprise:
- obtaining a value of a flag that indicates whether an intra-prediction mechanism is applied; and
- comparing the value of the obtained flag with a predetermined binary value.

* * * * *